US012658436B2

(12) United States Patent
Son et al.

(10) Patent No.: US 12,658,436 B2
(45) Date of Patent: Jun. 16, 2026

(54) COMPOSITE CATHODE ACTIVE MATERIAL, CATHODE AND LITHIUM BATTERY INCLUDING COMPOSITE CATHODE ACTIVE MATERIAL AND PREPARATION METHOD THEREOF

(71) Applicant: Samsung SDI Co., Ltd., Yongin-si (KR)

(72) Inventors: Inhyuk Son, Yongin-si (KR); Guesung Kim, Yongin-si (KR); Sangkook Mah, Yongin-si (KR); Kyueun Shim, Yongin-si (KR); Andrei Kapylou, Yongin-si (KR); Sungnim Jo, Yongin-si (KR); Jinhwan Park, Yongin-si (KR); Jongseok Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 669 days.

(21) Appl. No.: 17/993,610

(22) Filed: Nov. 23, 2022

(65) Prior Publication Data

US 2023/0170479 A1 Jun. 1, 2023

(30) Foreign Application Priority Data

Nov. 26, 2021 (KR) ........................ 10-2021-0166114

(51) Int. Cl.
H01M 4/525 (2010.01)
H01M 4/02 (2006.01)
(Continued)

(52) U.S. Cl.
CPC ........... H01M 4/525 (2013.01); H01M 4/366 (2013.01); H01M 4/505 (2013.01); H01M 4/625 (2013.01); *H01M 2004/021* (2013.01)

(58) Field of Classification Search
CPC .... H01M 4/525; H01M 4/366; H01M 4/0471; H01M 4/505; H01M 4/625
See application file for complete search history.

(56) References Cited

U.S. PATENT DOCUMENTS 9,368,786 B2 6/2016 Lee et al.
10,199,641 B2 2/2019 Hong et al.
(Continued)

FOREIGN PATENT DOCUMENTS

CN 109830654 A 5/2019
CN 110176579 A 8/2019
(Continued)

OTHER PUBLICATIONS

Office action issued on Feb. 3, 2025 by KIPO for corresponding Korean Patent Application No. 10-2021-0166114, 14 pages.
(Continued)

*Primary Examiner* — Sarah A. Slifka
(74) *Attorney, Agent, or Firm* — Womble Bond Dickinson (US) LLP

(57) ABSTRACT

A composite cathode active material, a cathode and a lithium battery including the composite cathode active material, and a preparation method of the composite cathode active material are provided. The composite cathode active material includes a first core including a first lithium transition metal oxide; a second core including a second lithium transition metal oxide; and a shell along a surface of at least one of the first core or the second core, wherein the shell includes a first metal oxide represented by Formula $M_aO_b$ and a carbonaceous material, wherein the first metal oxide is within a carbonaceous metal matrix, the first lithium transition metal oxide and the second lithium transition metal oxide have a different particle size from each other, and the second (Continued)

lithium transition metal oxide includes a primary particle having a particle size of about 1 μm or more.

22 Claims, 6 Drawing Sheets

(51) Int. Cl.

| | |
|---|---|
| *H01M 4/36* | (2006.01) |
| *H01M 4/505* | (2010.01) |
| *H01M 4/62* | (2006.01) |

(56) References Cited

U.S. PATENT DOCUMENTS

| | | | |
|---|---|---|---|
| 10,249,871 | B2 | 4/2019 | Son et al. |
| 10,490,859 | B2 | 11/2019 | Tsubouchi et al. |
| 2006/0257745 | A1 | 11/2006 | Choi et al. |
| 2010/0310940 | A1 | 12/2010 | Seong-Bae et al. |
| 2015/0079471 | A1 | 3/2015 | Fang et al. |
| 2015/0162598 | A1 | 6/2015 | Kim et al. |
| 2015/0333324 | A1 | 11/2015 | Umeyama et al. |
| 2019/0260017 | A1 | 8/2019 | Yoo et al. |
| 2020/0152981 | A1 | 5/2020 | Kim et al. |
| 2020/0227732 | A1 | 7/2020 | Takahiro et al. |
| 2020/0365880 | A1 | 11/2020 | Jang |
| 2023/0170470 | A1 | 6/2023 | Son et al. |
| 2023/0170476 | A1 | 6/2023 | Shim et al. |
| 2023/0268485 | A1* | 8/2023 | Moon .................. H01M 4/485 429/231.95 |

FOREIGN PATENT DOCUMENTS

| | | | |
|---|---|---|---|
| CN | 112786846 | A | 5/2021 |
| JP | 2000-082466 | | 3/2000 |
| JP | 2005-174655 | A | 6/2005 |
| JP | 2012-043787 | A | 3/2012 |
| JP | 2018-505508 | A | 2/2018 |
| JP | 2018-106840 | A | 7/2018 |
| JP | 2021-176123 | A | 11/2021 |
| KR | 10-2006-0091486 | A | 8/2006 |
| KR | 2014-0018685 | A | 2/2014 |
| KR | 20150060467 | A | 6/2015 |
| KR | 10-2015-0141473 | A | 12/2015 |
| KR | 2019-0065963 | A | 6/2019 |
| KR | 20190117049 | A | 10/2019 |
| KR | 10-2020-0130346 | | 11/2020 |
| KR | 20210074304 | A * | 6/2021 | .............. F26B 3/084 |
| WO | WO 2022/260383 | A1 | 12/2022 |

OTHER PUBLICATIONS

Seah, M.P., et al: "Critical review of the current status of thickness measurements for ultrathin $SiO_2$ on Si Part V: Results of a CCOM pilot study", Surface and Interface Analysis, vol. 36, No. 9, Sep. 1, 2004, pp. 1269-1303.

Hogg, Richard: "Issues in particle size analysis", Kona Powder and Particle Journal, vol. 26, 1 Jan. 1, 2008, pp. 81-93.

Anonymous: Transition Metal, Wikipedia, https://en.wikipedia.org/wiki/Transition_metal, Dec. 31, 2020, pp. 1-8.

Son, In Hyuk: Graphene Balls for Lithium Rechargeable Batteries with Fast Charging and High Volumetric Energy Densities, Nature Communications, vol. 8: 1561, Nov. 16, 2017, pp. 1-11.

Extended European Search Report dated Mar. 27, 2023, issued in corresponding European Patent Application No. 22209696.8.

Arakawa, Masafumi, *Introduction to Particle Size Measurement*, 17(6) Journal of the Society of Powder Technology, Japan 299-307, Jun. 10, 1980, with English abstract, total 10 pages.

Office Action issued by the Japanese Patent Office for Application No. 2022-189324, mailed on Nov. 20, 2023, 3 pages.

Office action issued Dec. 9, 2025 by CNIPA for corresponding Chinese Patent Application No. 202211503215.6, 9 pages.

* cited by examiner

SDI 5.0kV 9.2mm x20.0k SE(M) 2.00μm

COMPOSITE CATHODE ACTIVE MATERIAL, CATHODE AND LITHIUM BATTERY INCLUDING COMPOSITE CATHODE ACTIVE MATERIAL AND PREPARATION METHOD THEREOF

CROSS-REFERENCE TO RELATED APPLICATION

This application claims priority to and the benefit of Korean Patent Application No. 10-2021-0166114, filed on Nov. 26, 2021, in the Korean Intellectual Property Office, the entire content of which is hereby incorporated by reference.

BACKGROUND

1. Field

One or more embodiments relate to a composite cathode active material, a cathode and a lithium battery including the composite cathode active material, and a preparation method of the composite cathode active material.

2. Description of the Related Art

As one or more suitable devices have become increasingly smaller in size and have higher performance, it has become increasingly important for lithium batteries not only to be smaller in size and lighter in weight, but also to have higher energy density. For example, lithium batteries having high capacity have become increasingly important.

To realize a lithium battery suitable for this purpose, a cathode active material having high capacity is being studied.

Related art nickel-based cathode active materials, due to side reactions, show diminished lifetime characteristics and unsatisfactory thermal stability.

Accordingly, there is a need or desire for a method for preventing or reducing a decrease in battery performance for nickel-based cathode active materials.

SUMMARY

Aspects of one or more embodiments of the present disclosure are directed towards a novel composite cathode active material capable of preventing or reducing degradation of lithium performance by suppressing side reactions of the composite cathode active material and improving reversibility of electrode reactions.

Aspects of one or more embodiments of the present disclosure are directed towards a cathode including the composite cathode active material.

Aspects of one or more embodiments of the present disclosure are directed towards a lithium secondary battery employing the cathode.

Aspects of one or more embodiments of the present disclosure are directed towards a method of preparing the composite cathode active material.

Additional aspects will be set forth in part in the description which follows and, in part, will be apparent from the description, or may be learned by practice of the presented embodiments of the disclosure.

According to one or more embodiments of the present disclosure, a composite cathode active material includes: a first core including a first lithium transition metal oxide; a second core including a second lithium transition metal oxide; and a shell along (e.g., around) a surface of at least one of the first core or the second core, wherein the shell includes a first metal oxide represented by Formula $M_aO_b$ ($0<a\leq3$, and $0<b<4$, wherein when a is 1, 2, or 3, b is not an integer); and a carbonaceous material, and wherein the first metal oxide is within a carbonaceous material matrix, and M is at least one metal selected from Groups 2 to 13, 15, and 16 of the Periodic Table, wherein the first lithium transition metal oxide and the second lithium transition metal oxide have a different particle diameter from each other, and wherein the second lithium transition metal oxide includes a primary particle having a particle diameter of 1 μm or more.

According to one or more embodiments of the present disclosure, a cathode includes the composite cathode active material.

According to one or more embodiments of the present disclosure, a lithium battery includes the cathode.

According to one or more embodiments of the present disclosure, a method of preparing a composite cathode active material includes: supplying a first lithium transition metal oxide; supplying a second lithium transition metal oxide; supplying a composite; preparing at least one of a first core/shell structure obtained by mechanically milling the first lithium transition metal oxide and the composite, or a second core/shell structure obtained by mechanically milling the second lithium transition metal oxide and the composite; and mixing the first core/shell structure with the second lithium transition metal oxide, mixing the second core/shell structure with the first lithium transition metal oxide, or mixing the first core/shell structure with the second core/shell structure, wherein the composite includes: a first metal oxide represented by Formula $M_aO_b$ ($0<a\leq3$, and $0<b<4$, wherein when a is 1, 2, or 3, b is not an integer); and a carbonaceous material, and wherein the first metal oxide is within a carbonaceous material matrix, and M is at least one metal selected from Groups 2 to 13, 15, and 16 of the Periodic Table, wherein the first lithium transition metal oxide and the second lithium transition metal oxide have a different particle diameter from each other, and wherein the second lithium transition metal oxide includes a primary particle having a particle diameter of 1 μm or more.

BRIEF DESCRIPTION OF THE DRAWINGS

The above and other aspects, features, and/or principles of certain embodiments of the present disclosure will be more apparent from the following description taken in conjunction with the accompanying drawings, in which.

DETAILED DESCRIPTION

Figure 1:
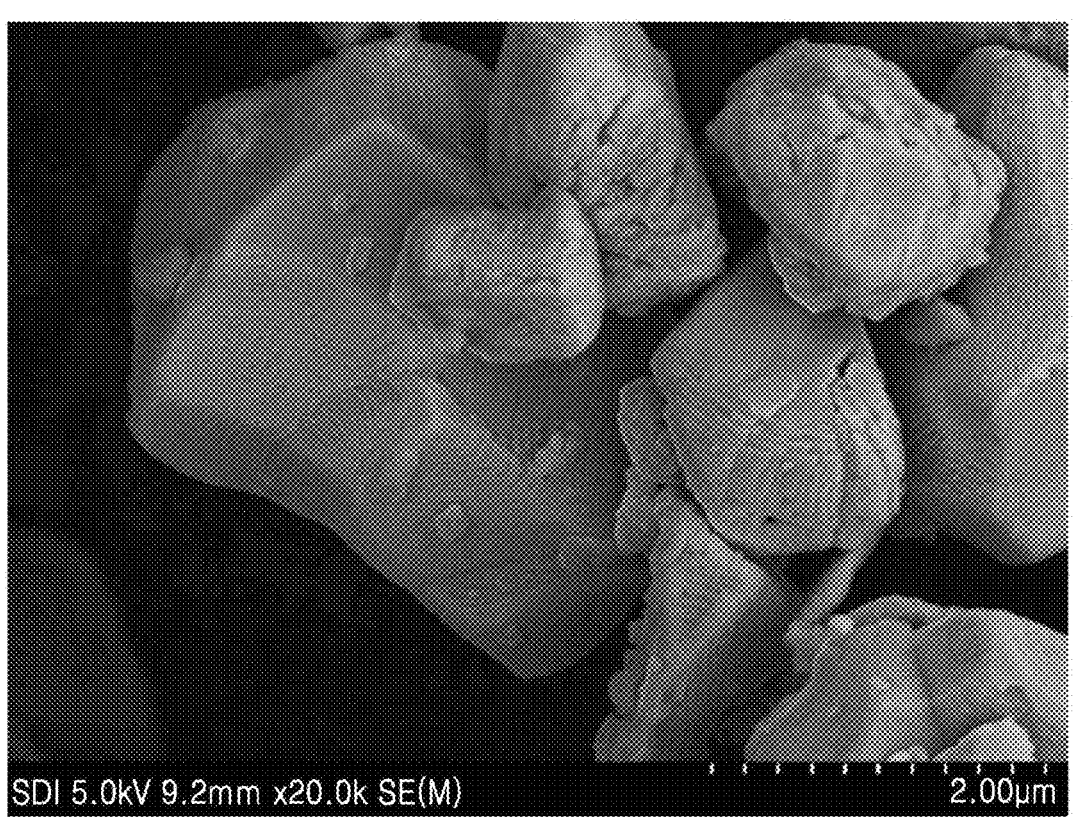
FIG. 1 is a scanning electron microscopy image of second lithium transition metal oxide particles of Example 1.

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described below, by referring to the drawings, to explain aspects of the present description. Accordingly, processes, elements, and techniques that are not necessary to those having ordinary skill in the art for a complete understanding of the aspects and features of the present disclosure may not be described.

As utilized herein, the term "and/or" includes any and all combinations of one or more of the associated listed items. Expressions such as "at least one of," "a plurality of," "one of," and other prepositional phrases, when preceding a list of elements, should be understood as including the disjunctive if written as a conjunctive list and vice versa. For example, the expressions "at least one of a, b, or c," "at least one of a, b, and/or c," "one selected from the group consisting of a, b, and c," "at least one selected from a, b, and c," "at least one from among a, b, and c," "one from among a, b, and c", "at least one of a to c", "at least one from a, b, or c", etc., indicates only a, only b, only c, both a and b, both a and c, both b and c, all of a, b, and c, or variations thereof.

The present disclosure, which will be described more fully hereinafter, may have one or more suitable variations and one or more suitable embodiments, and specific embodiments will be shown the accompanied drawings and described in greater details. However, the present disclosure should not be construed as limited to specific embodiments set forth herein. Rather, these embodiments are to be understood as encompassing all variations, equivalents, or alternatives included in the scope of the present disclosure.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. As used herein, the terms "comprises" and/or "comprising," or "includes" and/or "including" when used in this specification, specify the presence of stated features, regions, integers, steps, operations, elements, components, ingredients, materials, or combinations thereof, but do not preclude the presence or addition of one or more other features, regions, integers, steps, operations, elements, components, ingredients, materials, or combinations thereof. As used herein, "/" may be interpreted as "and", or as "or" depending on the context.

In the drawings, the thicknesses of layers and regions may be exaggerated for clarity and convenience of description. Like reference numerals denote like elements throughout, and duplicative descriptions thereof may not be provided the specification. When it is described that a certain component, such as a layer, a film, a region, or a plate, is "above," "connected to," or "on" another component, the certain component may be directly above, connected to or on another component, or a third component may be interposed therebetween. In addition, it will also be understood that when an element or layer is referred to as being "between" two elements or layers, it can be the only element or layer between the two elements or layers, or one or more intervening elements or layers may also be present.

Further, the use of "may" when describing embodiments of the present disclosure refers to "one or more embodiments of the present disclosure."

It will be understood that, although the terms "first," "second," etc. may be used herein to describe various elements, these elements should not be limited by these terms. These terms are only used to distinguish one element from another element.

In the present application, the term "particle diameter" of a particle refers to a particle diameter or an average particle diameter when the particle is spherical, and for a particle that is non-spherical, said term refers to a major axis length or an average major axis length of the particle. The particle diameter of particles may be measured utilizing a particle size analyzer (PSA). "Particle diameter" of particles may be, for example, an average diameter of the particles. The average particle diameter may be, for example, a median particle diameter (D50). Median particle diameter (D50) refers to a particle size corresponding to a cumulative volume of 50 vol % in a particle size distribution as measured by laser diffraction method when counting from the smallest particle size.

Hereinafter, a composite cathode active material according to example embodiments, a cathode and a lithium battery including (e.g., containing) the composite cathode active material, and a method of preparing the composite cathode active material will be described in greater detail.

The composite cathode active material may include: a first core including a first lithium transition metal oxide; a second core including a second lithium transition metal oxide; and a shell disposed along a surface of at least one of the first core and/or the second core, wherein the shell includes a first metal oxide (e.g., at least one first metal oxide) represented by Formula $M_aO_b$ (0<a≤3, 0<b<4, wherein when a is 1, 2, or 3, b is not an integer); and a carbonaceous material, wherein the first metal oxide is disposed within a carbonaceous metal matrix, M is at least one metal from (e.g., selected from among) Groups 2 to 13, Group 15, and/or Group 16 of the Periodic Table, the first lithium transition metal oxide and the second lithium transition metal oxide have a different average particle diameter from each other, and the second lithium transition metal oxide includes a primary particle having a particle diameter of about 1 μm or more.

Hereinafter, the following description is made for the purpose of providing a basis that provides an excellent or suitable effect of a composite cathode active material according to one or more embodiments, and is only to help the understanding of the present disclosure disclosed herein and is not meant to limit the present disclosure in any way.

Referring to FIG. 1, a primary particle included in the second lithium transition metal oxide may have one body particle shape (e.g., the primary particles (including the primary particle) may be separate, individual particles). By including a primary particle with a particle diameter of 1 μm or more, that is, one body particle, the second lithium transition metal oxide has a reduced specific surface area and has reduced crack formation during charging/discharging, and thus may reduce side reactions with an electrolyte during charging/discharging. Accordingly, the cycle characteristics of a lithium battery that employs a composite cathode active material including (e.g., containing) the above-described second lithium transition metal oxide may be further improved. When the second lithium transition metal oxide is an agglomerate of a plurality of primary particles having a particle diameter of less than 1 μm, the specific surface area of the agglomerate increases, and as the formation of cracks during charging/discharging increases, side reactions with the electrolyte during the process of charging/discharging may increase. The primary particle having a particle diameter of 1 μm or more included in the second lithium transition metal oxide may be, for example, a single crystal particle.

In one or more embodiments, the composite cathode active material may include a first core corresponding to the first lithium transition metal oxide and a second core corresponding to the second lithium transition metal oxide, and as the first lithium transition metal oxide and the second lithium transition metal oxide have a different particle diameter from each other, the second core may be disposed in a pore between the first cores, or the first core may be disposed in a pore between the second cores. Accordingly, as some core particles are additionally disposed in pores between the other core particles, ionic conductivity of a cathode containing the above-described composite cathode active material may be improved. In one or more embodiments, because the shell of the core particles includes a carbonaceous material, as some of the core particles are additionally disposed in pores between the other core particles, electron conductivity of a cathode including (e.g., containing) the above-described composite cathode active material may be improved. Consequently, high-temperature cycle characteristics of a lithium battery including the composite cathode active material may be improved, and an increase of internal resistance thereof may be suppressed or reduced. In one or more embodiments, as some of the core particles are additionally disposed in pores between the other core particles, energy density of a lithium battery including (e.g., containing) the composite cathode active material may be improved.

In cathodes of the related art, as carbonaceous conductive materials are disposed in pores between cathode active material particles, electron conductivity of the cathode may be improved, but as carbonaceous conductive materials do not possess ion conductivity, ion conductivity of the cathode may be reduced. In addition, as the thickness of a cathode active material layer increases, such a decrease in ion conductivity of the cathode may become significant. Accordingly, degradation in performance of a lithium battery employing such a related art cathode may become more prominent.

By utilizing a composite that includes a plurality of first metal oxides disposed in a carbonaceous material matrix, the composite cathode active material may prevent or reduce agglomeration of the carbonaceous material and allow a substantially uniform shell to be disposed on the first core and/or the second core. Accordingly, by effectively preventing or reducing the contact between the cores and the electrolyte, side reactions due to the contact between the cores and the electrolyte may be prevented or reduced. In one or more embodiments, as cation mixing due to the electrolyte is suppressed or reduced, the formation of resistant layers may be suppressed or reduced. In one or more embodiments, elution of transition metal ions may be suppressed or reduced. The carbonaceous material may be, for example, a crystalline carbonaceous material. The carbonaceous material may be, for example, a carbonaceous nanostructure. The carbonaceous material may be, for example, a carbonaceous two-dimensional nanostructure. The carbonaceous material may be, for example, graphene. In this case, the shell including graphene and/or a matrix thereof has elasticity and thus can flexibly accommodate volume changes of the composite cathode active material during charging/discharging, and as a result, crack formation inside the composite cathode active material may be suppressed or reduced. Because graphene has high electron conductivity, interfacial resistance between the composite cathode active material and electrolyte may be decreased. Accordingly, even when the shell including (e.g., containing graphene) is introduced, the internal resistance of the lithium battery may remain substantially the same or decrease. In contrast, the carbonaceous material in the related art easily agglomerates and thus, makes it difficult to form a uniform (or substantially uniform) coating on a lithium transition metal oxide core.

Because the carbonaceous material included in the shell of the composite cathode active material is derived from the graphene matrix, the carbonaceous material has a relatively low density and high porosity compared to carbonaceous material derived from graphite materials in the related art. The interplanar distance d002 of the carbonaceous material included in the shell of the composite cathode active material may be, for example, 3.38 Å or more, 3.40 Å or more, 3.45 Å or more, 3.50 Å or more, 3.60 Å or more, 3.80 Å or more, or 4.00 Å or more. The interplanar distance d002 of the carbonaceous material included in the shell of the composite cathode active material may be, for example, about 3.38 Å to about 4.0 Å, about 3.38 Å to about 3.8 Å, about 3.38 Å to about 3.6 Å, about 3.38 Å to about 3.5 Å, or about 3.38 Å to about 3.45 Å. In contrast, the interplanar distance d002 of the carbonaceous materials derived from graphite materials in the related art may be, for example, 3.38 Å or less, or from about 3.35 Å to about 3.38 Å.

A first metal oxide, due to having the capacity to withstand high and/or extreme voltages, may prevent or reduce degradation of lithium transition metal oxides included in the core when charging/discharging at high voltages. For example, the shell may include a single type or kind of first metal oxide, or two or more different types (kinds) of first metal oxides. Consequently, a lithium battery including the above-described composite cathode active material may have improved high-temperature cycle characteristics.

In the composite cathode active material, for example, the content (e.g., amount) of the shell may be about 0.1 wt % to about 3 wt %, about 0.1 wt % to about 2.5 wt %, about 0.5 wt % to about 2 wt %, or about 0.1 wt % to about 1.5 wt %, relative to the total weight of the composite cathode active material. In one or more embodiments, the content (e.g., amount) of the first metal oxide may be, for example, about 0.06 wt % to about 1.8 wt %, about 0.06 wt % to about 1.5 wt %, about 0.06 wt % to about 1.2 wt %, or about 0.06 wt % to about 0.9 wt %, relative to the total weight of the composite cathode active material. The composite cathode active material including the shell and the first metal oxide in such ranges, respectively, may have improved cycle characteristics of the lithium battery.

Figure 2:
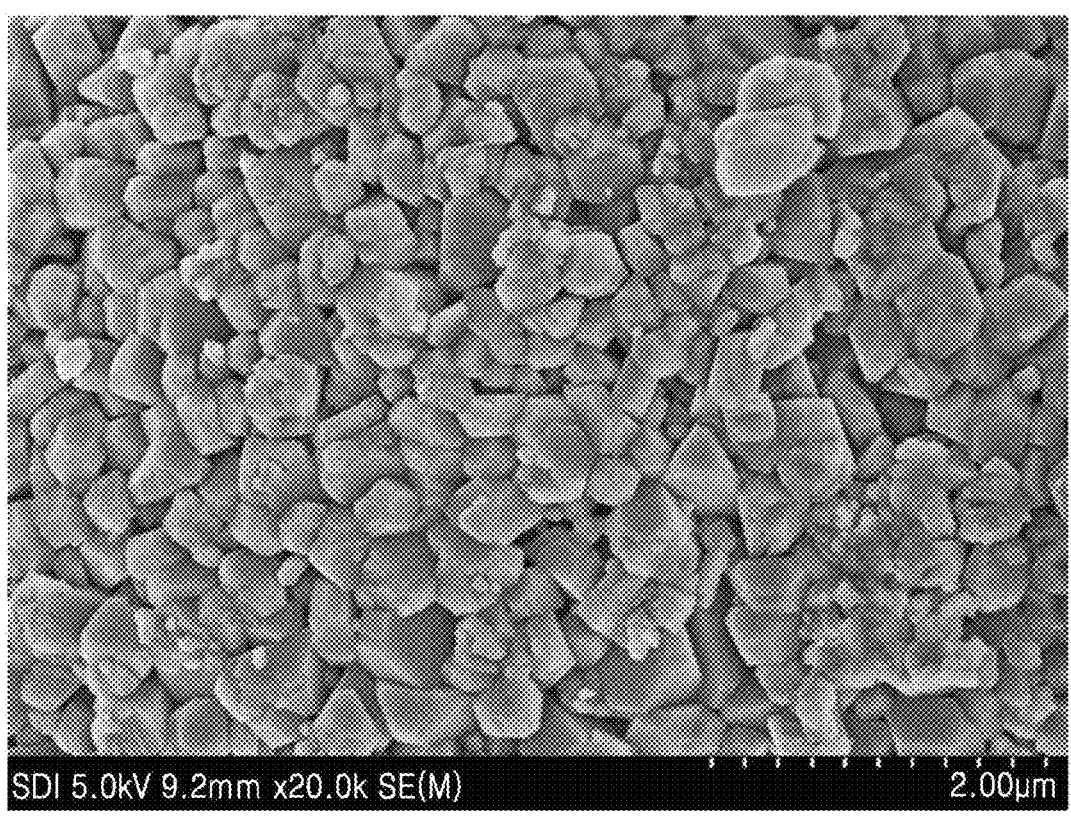
FIG. 2 is a scanning electron microscopy image of first lithium transition metal oxide particles of Example 1.
Figure 3:
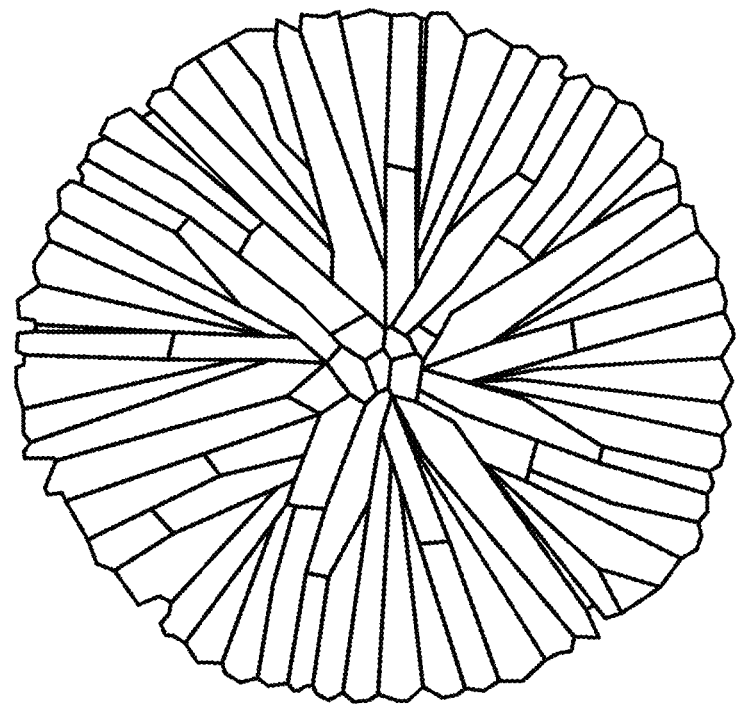
FIG. 3 is a schematic cross-sectional diagram of a first lithium transition metal oxide particle of Example 1.

Referring to FIG. 2, the composite cathode active material may include a first lithium transition metal oxide, and the first lithium transition metal oxide may include a secondary particle including a plurality of primary particles. Referring to FIG. 3, a secondary particle may have a structure in which primary particles are radially arranged (e.g., the primary particles of the structure (of the secondary particle) are radially arranged). For example, the primary particle may be a plate particle. A major axis of a plate primary particle may be radially arranged. Accordingly, the secondary particle of the first lithium transition metal oxide may have a structure in which plate primary particles are radially arranged (e.g., the plate primary particles of the structure (of the secondary particle) are radially arranged). As used herein, the term "radial(ly)" refers to an arrangement in which a thickness direction of a primary particle is perpendicular to a direction toward a center of a secondary particle. The term "plate primary particle" or "plate particle" as used herein refers to a particle whose thickness is smaller than a major axis length (a plane direction) of the particle. The major axis length of a plate particle refers to a maximum length of the widest plane of the plate particle. For example, the plate particle refers to a primary particle structure in which a length of a primary particle in one axial direction (i.e., a thickness direction) is smaller than a major axis length of the particle in the other direction (i.e., a plane direction). A plate primary particle may have a polygonal nanoplate shape such as a hexagonal plate shape, a circular nanodisc shape, a rectangular shape, and/or the like. The ratio of an average thickness and an average length of a plate primary particle may be about 1:2 to about 1:19, or about 1:2 to about 1:5. A structure in which a plurality of plate primary particles are radially arranged, refers to a structure in which the plate primary particles are arranged such that a thickness direction of the plate primary particles is perpendicular to a direction toward a center of secondary particle from the surface of the secondary particle.

Referring to FIG. 2, for example, as first lithium transition metal oxide secondary particles have (e.g., each have) a structure in which a plurality of plate primary particles are radially arranged (to form a secondary particle), on and around the surface of the first lithium transition metal oxide secondary particles, lithium diffusion paths between relatively increased grain boundaries and a crystal plane capable of externally transferring lithium, e.g., (001) plane, may be more exposed. Accordingly, in the first lithium transition metal oxide secondary particles having such a structure, diffusion rate of lithium may be increased. As a result, it is possible to improve initial capacity and increase discharge capacity of a lithium battery including (e.g., containing) the first lithium transition metal oxide secondary particles. Additionally, because the first lithium transition metal oxide secondary particles have a structure in which plate primary particles are radially arranged, pores exposed on surfaces between the plate primary particles are positioned toward a central direction of the secondary particles. As a result, diffusion of lithium from the surface of the secondary particles into the secondary particles may be facilitated. The inner portion and outer portion of the first lithium transition metal oxide secondary particles may have closed pores and/or open pores. Closed pores are difficult to contain electrolyte and/or the like, whereas open pores may contain electrolyte and/or the like in the pores. Uniform shrinking and expanding are possible during intercalation and deintercalation of lithium as the first lithium transition metal oxide secondary particles include radially arranged plate primary particles. Pores present in the (001) direction, which is a direction in which the primary particles expand during intercalation and deintercalation of lithium, may serve to buffer volume changes. Due to small sizes of primary plate particles, the probability of occurrence of cracks in the secondary particles may decrease during shrinkage and expansion of the primary particles. Because pores inside the secondary particles can accommodate volume changes of the plate primary particles, the probability of occurrence of cracks between the plate primary particles may be further reduced during charging and discharging. Thus, a lithium battery including (e.g., containing) the first lithium transition metal oxide secondary particles may have improved lifetime characteristics and a reduced likelihood of an increase of internal resistance.

The first lithium transition metal oxide secondary particles may contain pores within the secondary particles. The first lithium transition metal oxide secondary particles may include an inner portion and an outer portion, and a porosity of the inner portion may be higher than a porosity of the outer portion. As used herein, the term "outer portion of secondary particle(s)" refers to, for example, a region within about 2 μm toward the center of the secondary particle from the surface of the secondary particle. In one or more embodiments, the term "outer portion of secondary particle (s)" refers to a region of about 40% by length from the surface of the secondary particle, of the total distance from the center of the secondary particle to the surface thereof. As used herein, the term "inner portion of secondary particle(s)" refers to a remaining region except for a region within about 2 μm from the surface of the secondary particle. In one or more embodiments, the term "inner portion of secondary particle(s)" refers to a region of about 60% by length from the center of the secondary particle, of the total distance from the center of the secondary particle to the surface thereof. As used herein, the term "porosity of the inner portion" refers to a ratio of a volume occupied by pores with respect to the volume of the inner portion of a secondary particle. As used herein, the term "porosity of the outer portion" refers to a ratio of a volume occupied by pores with respect to the volume of the outer portion of a secondary particle.

In the composite cathode active material, the first lithium transition metal oxide may be a large-diameter lithium transition metal oxide having a larger particle diameter than that of the second lithium transition metal oxide. For example, the second lithium transition metal oxide may be a small-diameter lithium transition metal oxide having a smaller particle diameter than that of the first lithium transition metal oxide. For example, the first core may be a large-diameter lithium transition metal oxide, and the second core may be a small-diameter lithium transition metal oxide. For example, a second core having an average particle diameter smaller than that of a first core may be disposed in a pore between the first cores. Second core particles, which are small-diameter particles, disposed in pores between first core particles, which are large-diameter particles, can have concurrently (e.g., simultaneously) improved both (e.g., simultaneously) ionic conductivity and electron conductivity of a cathode including the composite cathode active material. In one or more embodiments, energy density of a cathode including the composite cathode active material can be improved. As a result, a lithium battery including the composite cathode active material may have improved energy density and improved cycle characteristics.

The first lithium transition metal oxide and the second lithium transition metal oxide may have, for example, a bimodal particle size distribution in the particle size distribution diagram. For example, in the particle size distribution diagram obtained utilizing a particle size analyzer (PSA) and/or the like, the composite cathode active material may show a bimodal particle size distribution having two peaks. The bimodal particle size distribution may have a first peak corresponding to the first lithium transition metal oxide, and a second peak corresponding to the second lithium transition metal oxide.

The first lithium transition metal oxide and the second lithium transition metal oxide may have, for example, a particle size ratio of about 3:1 to about 40:1, about 3:1 to about 30:1, about 3:1 to about 20:1, about 3:1 to about 10:1, or about 3:1 to about 5:1. When the first lithium transition metal oxide and the second lithium transition metal oxide have a particle size ratio in such ranges, the energy density and/or cycle characteristics of a lithium battery including the composite cathode active material may be further improved.

The particle diameter of the first lithium transition metal oxide may be, for example, more than 8 μm to about 30 μm, about 9 μm to about 25 μm, about 9 μm to about 20 μm, about 9 μm to about 15 μm, or about 9 μm to about 12 μm. The particle diameter of the first lithium transition metal oxide may be, for example, a median particle diameter (D50). The particle diameter of the second lithium transition metal oxide may be, for example, about 1 μm to about less than 8 μm, about 1 μm to about 7 μm, about 1 μm to about 6 μm, about 1 μm to about 5 μm, or about 1 μm to about 4 μm. The particle diameter of the second lithium transition metal oxide may be, for example, a median particle diameter (D50). When the first lithium transition metal oxide and the second lithium transition metal oxide have an average particle diameter in such ranges, respectively, the energy density and/or cycle characteristics of a lithium battery including the composite cathode active material may be further improved. The particle diameter of the first lithium transition metal oxide and the second lithium transition metal oxide may be measured, for example, by a measurement device utilizing laser diffraction or dynamic light scattering. The average diameter may be measured by, for example, a laser scattering particle size distribution analyzer (for example, LA-920 manufactured by HORIBA) and is a volume-based median particle diameter (D50) at a cumulative percentage of 50% from the smallest particle size.

The weight ratio of the first lithium transition metal oxide and the second lithium transition metal oxide may be, for example, about 90:10 to about 60:40, about 85:15 to about 65:35, about 80:20 to about 65:35, or about 75:25 to about 65:35. When the first lithium transition metal oxide and the second lithium transition metal oxide have a weight ratio in such ranges, the energy density and/or cycle characteristics of a lithium battery including the composite cathode active material may be further improved.

In the composite cathode active material, for example, the shell may be disposed only on the first core. In particular, the shell may be disposed on the first core and not disposed on the second core. For example, the shell may be disposed on the first lithium transition metal oxide, which is a large-diameter lithium transition metal oxide, and not disposed on the second lithium transition metal oxide, which is a small-diameter lithium transition metal oxide. A first core/shell structure may be obtained by disposition of the shell on the first core. By disposition of the shell on the surface of the large-diameter lithium transition metal oxide, the specific surface area of a large-diameter composite cathode active material may be reduced, side reactions between the large-diameter lithium transition metal oxide and electrolyte may also be reduced, and electronic conductivity of the large-diameter lithium transition metal oxide may be improved. As a result, the energy density and/or cycle characteristics of the lithium battery may be further improved.

In the composite cathode active material, for example, the shell may be disposed only on the second core. In particular, the shell may be disposed on the second core and not disposed on the first core. For example, the shell may be disposed on the second lithium transition metal oxide, which is a small-diameter lithium transition metal oxide, and not disposed on the first lithium transition metal oxide, which is a large-diameter lithium transition metal oxide. A second core/shell structure may be obtained by disposition of the shell on the second core. By disposition of the shell on the surface of the small-diameter lithium transition metal oxide, side reactions between the small-diameter lithium transition metal oxide and electrolyte may be reduced, and electronic conductivity of the small-diameter lithium transition metal oxide may be improved. As a result, the energy density and/or cycle characteristics of the lithium battery may be further improved.

In the composite cathode active material, for example, the shell may be disposed both (e.g., simultaneously) on the first core and the second core. For example, the shell may be disposed on the first core and on the second core, at the same time. For example, the shell may be disposed on the first lithium transition metal oxide, which is a large-diameter lithium transition metal oxide, and also on the second lithium transition metal oxide, which is a small-diameter lithium transition metal oxide. A first core/shell structure may be obtained by disposition of the shell on the first core, and a second core/shell structure may be obtained by disposition of the shell on the second core. When the composite cathode active material includes both (e.g., simultaneously) the first core/shell structure and the second core/shell structure, energy density and/or cycle characteristics of the lithium battery may be further improved.

The first metal oxide may include at least one metal of (e.g., one selected from among) Al, Nb, Mg, Sc, Ti, Zr, V, W, Mn, Fe, Co, Pd, Cu, Ag, Zn, Sb, and/or Se. The first metal oxide may be, for example, at least one of (e.g., one selected from among) $Al_2O_z$ (0<z<3), $NbO_x$ (0<x<2.5), $MgO_x$ (0<x<1), $Sc_2O_z$ (0<z<3), $TiO_y$ (0<y<2), $ZrO_y$ (0<y<2), $V_2O_z$ (0<z<3), $WO_y$ (0<y<2), $MnO_y$ (0<y<2), $Fe_2O_z$ (0<z<3), $Co_3O_w$ (0<w<4), $PdO_x$ (0<x<1), $CuO_x$ (0<x<1), $AgO_x$ (0<x<1), $ZnO_x$ (0<x<1), $Sb_2O_z$ (0<z<3), and/or $SeO_y$ (0<y<2). When such a first metal oxide is disposed inside a carbonaceous material matrix, uniformity of the shell disposed on the cores may be improved and the composite cathode active material's ability to withstand high and/or extreme voltages may be further improved. For example, the shell may include $Al_2O_x$ (0<x<3) as the first metal oxide.

The shell may further include at least one second metal oxide represented by $M_aO_c$ (0<a≤3 and 0<c≤4, wherein when a is 1, 2, or 3, c is an integer). M may be at least one metal from (e.g., one selected from) Groups 2 to 13, Group 15, and/or Group 16 of the Periodic Table. For example, the second metal oxide may include the same metal as the first metal oxide, and the ratio of a and c in the second metal oxide (c/a) may have a greater value than the ratio of a and b in the first metal oxide (b/a). For example, c/a>b/a. The second metal oxide may include (e.g., may be selected, for example, from among) $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and/or $SeO_2$. The first metal oxide may be, for example, a reduction product of the second metal oxide. The first metal oxide may be obtained from a partial or complete reduction of the second metal oxide. Accordingly, the first metal oxide may have a lower oxygen content (e.g., amount) and a lower oxidation number compared to the second metal oxide. For example, the shell may include the first metal oxide, $Al_2O_x$ (0<x<3) and the second metal oxide, $Al_2O_3$.

Hereinafter, unless otherwise specified, the term "core" is construed as including at least one of "the first core" and/or "the second core".

Hereinafter, unless otherwise specified, the term "lithium transition metal oxide" is interpreted as including at least one of "the first lithium transition metal oxide" and/or "the second lithium transition metal oxide".

In the composite cathode active material, for example, the carbonaceous material included in the shell and a transition metal of the lithium transition metal oxide included in the core may be chemically bound via a chemical bond. The carbon atom (C) of the carbonaceous material included in the shell, and the transition metal (Me) of the lithium transition metal oxide may be chemically bound, for example, through a C—O-Me bond via oxygen atoms (for example, C—O—Ni bond, or C—O—Co bond). When the carbonaceous material included in the shell and the lithium transition metal oxide included in the core are chemically bound via a chemical bond, the core and the shell are complexated (e.g., form a complex). Accordingly, the resulting complex may be distinguished from a simple physical mixture of the carbonaceous material and the lithium transition metal oxide.

In one or more embodiments, the carbonaceous material and the first metal oxide included in the shell may also be chemically bound via a chemical bond. Here, the chemical bond may be, for example, a covalent bond or an ionic bond. The covalent bond may be a bond that includes, for example, at least one of (e.g., one from among) an ester group, an ether group, a carbonyl group, an amide group, a carbonate anhydride group, and/or an acid anhydride group. The ionic bond may be a bond that includes, for example, a carboxylic acid ion, an ammonium ion, an acyl cation group, and/or the like.

The thickness of the shell may be, for example, about 1 nm to about 5 μm, about 1 nm to about 1 μm, about 1 nm to about 500 nm, about 1 nm to about 200 nm, about 1 nm to about 100 nm, about 1 nm to about 90 nm, about 1 nm to about 80 nm, about 1 nm to about 70 nm, about 1 nm to about 60 nm, about 1 nm to about 50 nm, about 1 nm to about 40 nm, about 1 nm to about 30 nm, or about 1 nm to about 20 nm. When the shell has a thickness in such ranges, a cathode including the composite cathode active material may have further improved electron conductivity.

The composite cathode active material may further include, for example, a third metal doped on a core, or a third metal oxide coated on the core. In one or more embodiments, the shell may be disposed on the third metal doped in the core, or on the third metal oxide coated on the core. For example, after the third metal is doped on a surface of the lithium transition metal oxide included in the core, or the third metal oxide is coated on a surface of the lithium transition metal oxide included in the core, the shell may be disposed on the third metal and/or the third metal oxide. For example, the composite cathode active material may include a core; an interlayer disposed on the core; and a shell disposed on the interlayer, wherein the interlayer may include a third metal or a third metal oxide. The third metal may be at least one metal of (e.g., one selected from) Al, Zr, W, and/or Co, and the third metal oxide may be $Al_2O_3$, $Li_2O$—$ZrO_2$, $WO_2$, CoO, $Co_2O_3$, $Co_3O_4$, or a combination thereof.

The shell disposed along the surface of at least one of the first core and/or the second core may include at least one of (e.g., one selected from among), for example, a composite including a first metal oxide and a carbonaceous material, e.g., graphene, and/or a milling product of the composite. The first metal oxide may be disposed in a matrix of a carbonaceous material, for example, a graphene matrix. The shell may be prepared, for example, from a composite including a first metal oxide, and a carbonaceous material, e.g. graphene. The composite may further include a second metal oxide in addition to the first metal oxide. The composite may include, for example, two or more types (kinds) of first metal oxide. The composite may include, for example, two or more types (kinds) of first metal oxide and two or more types (kinds) of second metal oxide.

The content (e.g., amount) of at least one of the composite included in the composite cathode active material and/or a milling product thereof may be 3 wt % or less, 2 wt % or less, 1 wt % or less, or 0.5 wt % or less, relative to the total weight of the composite cathode active material. The amount of at least one of the composite and/or a milling product thereof may be about 0.01 wt % to about 3 wt %, about 0.01 wt % to about 1 wt %, about 0.01 wt % to about 0.7 wt %, or about 0.01 wt % to about 0.5 wt %, with respect to the total weight of the composite cathode active material. When the composite cathode active material includes at least one of the composite and/or the milling product thereof in an amount in such ranges, a lithium battery including the composite cathode active material may have further improved cycle characteristics.

The content (e.g., amount) of at least one of the composite included in the first core/shell structure and/or a milling product thereof may be 3 wt % or less, 2 wt % or less, 1 wt % or less, or 0.5 wt % or less, relative to the total weight of the first core/shell structure. The amount of at least one of the composite and/or a milling product thereof may be about 0.01 wt % to about 3 wt %, about 0.01 wt % to about 1 wt %, about 0.01 wt % to about 0.7 wt %, or about 0.01 wt % to about 0.5 wt %, with respect to the total weight of the first core/shell structure. When the first core/shell structure includes at least one of the composite and/or the milling product thereof in an amount in such ranges, a lithium battery including the composite cathode active material may have further improved cycle characteristics.

The content (e.g., amount) of at least one of the composite included in the second core/shell structure and a milling product thereof may be 3 wt % or less, 2 wt % or less, 1 wt % or less, or 0.5 wt % or less, relative to the total weight of the second core/shell structure. The amount of at least one of the composite and a milling product thereof may be about 0.01 wt % to about 3 wt %, about 0.01 wt % to about 1 wt %, about 0.01 wt % to about 0.7 wt %, or about 0.01 wt % to about 0.5 wt %, with respect to the total weight of the second core/shell structure. When the second core/shell structure includes at least one of the composite and the milling product thereof in an amount in such ranges, a lithium battery including the composite cathode active material may have further improved cycle characteristics.

The particle diameter of at least one of the first metal oxide and/or the second metal oxide included in the composite may be about 1 nm to about 1 μm, about 1 nm to about 500 nm, about 1 nm to about 100 nm, about 1 nm to about 50 nm, about 1 nm to about 30 nm, about 3 nm to about 30 nm, about 3 nm to about 25 nm, about 5 nm to about 25 nm, about 5 nm to about 20 nm, about 7 nm to about 20 nm, or about 7 nm to about 15 nm. The first metal oxide and/or the second metal oxide due to having a particle diameter in such nano-sized ranges may be more uniformly distributed within the carbonaceous material matrix of the composite. Accordingly, the composite may be coated uniformly on the core without aggregation, to thereby form a shell. In one or more embodiments, the first metal oxide and/or the second metal oxide due to having a particle diameter in such ranges, may be more uniformly distributed on the core. Accordingly, as the first metal oxide and/or the second metal oxide are uniformly disposed on the core, withstand voltage properties may be more effectively achieved. The particle diameter of the first metal oxide and the second metal oxide may be measured, for example, by utilizing a measurement device utilizing laser diffraction or dynamic light scattering. The particle diameter may be measured by, for example, a laser scattering particle size distribution analyzer (for example, LA-920 manufactured by HORIBA) and is a volume-based median particle diameter (D50) at a cumulative percentage of 50% from the smallest particle size.

The deviation in uniformity of at least one of (e.g., one selected from) the first metal oxide and/or the second metal oxide included in the composite may be 3% or less, 2% or less, or 1% or less. Uniformity may be obtained, for example, by XPS. Accordingly, in the composite, at least one of (e.g., one selected from) the first metal oxide and/or the second metal oxide may be uniformly distributed with a deviation of 3% or less, 2% or less, or 1% or less.

The carbonaceous material included in the composite may have, for example, a branched structure, and at least one metal oxide of (e.g., one selected from among) the first metal oxide and/or the second metal oxide may be distributed within the branched structure of the carbonaceous material. The branched structure of the carbonaceous material may include, for example, a plurality of carbonaceous material particles in contact with one another. When the carbonaceous material has such a branched structure, various (e.g., multiple) conduction paths may be provided. The carbonaceous material included in the composite may be, for example, graphene. The graphene may have, for example, a branched structure, and at least one metal oxide of (e.g., one metal oxide selected from among) the first metal oxide and/or the second metal oxide may be distributed within the branched structure of graphene. The branched structure of graphene may include, for example, a plurality of graphene particles in contact with one another. When the graphene has such a branched structure, various (e.g., multiple) conduction paths may be provided.

The carbonaceous material included in the composite may have, for example, a spherical structure, and at least one metal oxide of (e.g., one metal oxide selected from among) the first metal oxide and/or the second metal oxide may be distributed within the spherical structure. The spherical structure of the carbonaceous material may have a size of about 50 nm to about 300 nm. There may be a plurality of such carbonaceous materials having a spherical structure. When the carbonaceous material has a spherical structure, the composite may have a secure or substantially secure structure. The carbonaceous material included in the composite may be, for example, graphene. The graphene may have, for example, a spherical structure, and at least one metal oxide of (e.g., one metal oxide selected from among) the first metal oxide and/or the second metal oxide may be distributed within the spherical structure. The spherical structure of graphene may have a size of about 50 nm to about 300 nm. There may be provided a plurality of such graphene having a spherical structure. When the graphene has a spherical structure, the composite may have a secure or substantially secure structure.

The carbonaceous material included in the composite may have, for example, a spiral structure in which spherical structures are connected (e.g., the spherical structures of the spiral structure are connected), and at least one metal oxide of (e.g., one metal oxide selected from among) the first metal oxide and/or the second metal oxide may be distributed within the spherical structures of the spiral structure. The spiral structure of the carbonaceous material may have a size of about 500 nm to about 100 μm. When the carbonaceous material has a spiral structure, the composite may have a secure or substantially secure structure. The carbonaceous material included in the composite may be, for example, graphene. The graphene may have, for example, a spiral structure in which a plurality of spherical structures is connected (e.g., the spherical structures of the spiral structure are connected), and at least one metal oxide of (e.g., one metal oxide selected from among) the first metal oxide and the second metal oxide may be distributed within the spherical structures of the spiral structure. The spiral structure of graphene may have a size of about 500 nm to about 100 μm. When the graphene has a spiral structure, the composite may have a secure or substantially secure structure.

The carbonaceous material included in the composite may have, for example, a cluster structure in which spherical structures are clustered (e.g., the spherical structures of the cluster structure are clustered), and at least one metal oxide of (e.g., one selected from among) the first metal oxide and/or the second metal oxide may be distributed within the spherical structures of the cluster structure. The cluster structure of the carbonaceous material may have a size of about 0.5 mm to about 10 mm. When the carbonaceous material has a cluster structure, the composite may have a secure structure. The carbonaceous material included in the composite may be, for example, graphene. The graphene may have, for example, a cluster structure in which a plurality of spherical structures is clustered (e.g., the spherical structures of the cluster structure are clustered), and at least one metal oxide of (e.g., one metal oxide selected from among) the first metal oxide and/or the second metal oxide may be distributed within the spherical structures of the cluster structure. The cluster structure of the graphene may have a size of about 0.5 mm to about 10 mm. When the graphene has a cluster structure, the composite may have a secure or substantially secure structure.

The composite may have, for example, a crumpled faceted-ball structure, and at least one of (e.g., one selected from) the first metal oxide and/or the second metal oxide may be distributed within or on a surface of the structure. When the composite is such a faceted-ball structure, the composite may be easily coated or coating would be facilitated on irregular surface bumps of the core.

The composite may have, for example, a planar structure, and at least one of (e.g., one selected from) the first metal oxide and/or the second metal oxide may be distributed within or on a surface of the structure. When the composite is such a two-dimension planar structure, the composite may be easily coated or coating would be facilitated on irregular surface bumps of the core.

The carbonaceous material included in the composite may extend from the first metal oxide by a distance of 10 nm or less and may include at least 1 to 20 carbonaceous material layers. For example, as a plurality of carbonaceous material layers are deposited, a carbonaceous material having a total thickness of 12 nm or less may be disposed on the first metal oxide. For example, the total thickness of the carbonaceous material may be about 0.6 nm to about 12 nm. The carbonaceous material included in the composite may be, for example, graphene. The graphene may extend from the first metal oxide by a distance of 10 nm or less and may include at least 1 to 20 graphene layers. For example, as a plurality of graphene layers is deposited, graphene having a total thickness of 12 nm or less may be disposed on the first metal oxide. For example, the total thickness of the graphene may be about 0.6 nm to about 12 nm.

The first core and the second core included in the composite cathode active material may each independently include, for example, a lithium transition metal oxide represented by one or more of Formulas 1 to 5.

$$Li_aNi_xCo_yM_zO_{2-b}A_b \qquad \text{Formula 1}$$

In Formula 1, $1.0 \leq a \leq 1.2$, $0 \leq b \leq 0.2$, $0.8 \leq x \leq 1$, and $0 \leq y \leq 0.3$, and $0 < z \leq 0.3$, wherein $x+y+z=1$, and M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof, and A is F, S, Cl, Br, or a combination thereof.

$$LiNi_xCo_yMn_zO_2 \qquad \text{Formula 2}$$

$$LiNi_xCo_yAl_zO_2 \qquad \text{Formula 3}$$

In Formulas 2 and 3, $0.8 \leq x \leq 0.95$, $0 \leq y \leq 0.2$, and $0 < z \leq 0.2$, wherein $x+y+z=1$.

$$LiNi_xCo_yMn_zAl_wO_2 \qquad \text{Formula 4}$$

In Formula 4, $0.8 \leq x \leq 0.95$, $0 \leq y \leq 0.2$, $0 < z \leq 0.2$, and $0 < w \leq 0.2$, wherein $x+y+z+w=1$.

The lithium transition metal oxide in Formulas 1 to 4, while having a high nickel content (e.g., amount) of 80 mol % or more, 85 mol % or more, or 90 mol % or more with respect to the total number of moles of transition metals, may provide excellent or suitable initial capacity, room-temperature lifetime characteristics, and high-temperature lifetime characteristics. For example, the lithium transition metal oxide in Formulas 1 to 4 may have a nickel content (e.g., amount) of about 80 mol % to about 99 mol %, about 85 mol % to about 99 mol %, or about 90 mol % to about 97 mol %, with respect to the total number of moles of transition metals.

$$Li_aCo_xM_yO_{2-b}A_b \qquad \text{Formula 5}$$

In Formula 5, $1.0 \leq a \leq 1.2$, $0 \leq b \leq 0.2$, $0.9 \leq x \leq 1$, and $0 \leq y \leq 0.1$, wherein $x+y=1$, and M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof, and A is F, S, Cl, Br, or a combination thereof.

A cathode according to one or more embodiments includes the above-described composite cathode active material. By including the above-described composite cathode active material, the cathode may provide improved energy density, improve cycle characteristics, and increased conductivity.

The cathode may be prepared by an example method described, but the method is not necessarily limited thereto and can be adjusted according to required conditions.

First, a cathode active material composition may be prepared by mixing the above-described composite cathode active material, a conductor, a binder, and a solvent. The cathode active material composition thus prepared may be directly coated or dried on an aluminum current collector to produce a cathode plate on which a cathode active material layer is formed. In one or more embodiments, the cathode active material composition may be cast on a separate support, and a film exfoliated from the support may be laminated on the aluminum current collector to thereby form a cathode plate with a cathode active material layer formed thereon.

Examples of the conductor may include: carbon black, graphite powder, natural graphite, artificial graphite, acetylene black, Ketjen black, and carbon fibers; carbon nanotubes; metal powder, metal fibers, or metal tubes, such as copper, nickel, aluminum, silver, etc.; and conductive polymers such as polyphenylene derivatives, and/or the like, but are not limited to the aforementioned components and may be any material that is utilized as a conductor in the art. In one or more embodiments, for example, the cathode may not contain any conductor.

Examples of the binder may include a vinylidene fluoride/hexafluoropropylene copolymer, polyvinylidene fluoride, polyacrylonitrile, polymethylmethacrylate, polytetrafluoroethylene (PTFE), a mixture of the aforementioned polymers, a styrene butadiene rubber-based polymer, and the solvent may be N-methylpyrrolidone (NMP), acetone, water, and/or the like, but is not necessarily limited thereto and may be any solvent utilized in the art.

It is also possible to create pores inside an electrode plate by further adding a plasticizer and a pore forming agent to the cathode active material composition.

The contents of the cathode active material, the conductor, the binder, and the solvent utilized in a cathode are at a level commonly used in a lithium battery. Depending on the intended use and composition of a lithium battery, one or more of the conductor, the binder, and the solvent may not be provided.

The amount of the binder included in the cathode may be about 0.1 wt % to about 10 wt %, or about 0.1 wt % to about 5 wt %, relative to the total weight of the cathode active material layer. The amount of the composite cathode active material included in the cathode may be about 80 wt % to about 99 wt %, about 90 wt % to about 99 wt %, or about 95 wt % to about 99 wt %, relative to the total weight of the cathode active material layer.

In one or more embodiments, the cathode may further include a common cathode active material other than the above-described composite cathode active material.

Such common cathode active materials may be, without limitations, any lithium-containing metal oxides commonly utilized in the art. Examples of such common cathode active materials include one or more of (e.g., one or more selected from) composite oxides of lithium with a metal including (e.g., selected from among) cobalt, manganese, nickel, and/or a combination thereof, and as a specific example, include a compound represented by any one of the following formulas: $Li_aA_{1-b}B_bD_2$ (In this formula, $0.90 \leq a \leq 1$ and $0 \leq b \leq 0.5$); $Li_aE_{1-b}B_bO_{2-c}D_c$ (In this formula, $0.90 \leq a \leq 1$, $0 \leq b \leq 0.5$, $0 \leq c \leq 0.05$); $LiE_{2-b}B_bO_{4-c}D_c$ (In this formula, $0 \leq b \leq 0.5$, $0 \leq c \leq 0.05$); $Li_aNi_{1-b-c}Co_bB_cD_\alpha$ (In this formula, $0.90 \leq a \leq 1$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (In this formula, $0.90 \leq a \leq 1$, $0 \leq b \leq 0.5$, $0 \leq c \leq 0.05$, $0 < \alpha < 2$); $Li_aNi_{1-b-c}Co_bB_cO_{2-\alpha}F_2$ (In this formula, $0.90 \leq a \leq 1$, $0 \leq b \leq 0.5$, $0 \leq c \leq 0.05$, $0 < \alpha < 2$); $Li_aNi_{1-b-c}Mn_bB_cD_\alpha$ (In this formula, $0.90 \leq a \leq 1$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (In this formula, $0.90 \leq a \leq 1$, $0 \leq b \leq 0.5$, $0 \leq c \leq 0.05$, $0 < \alpha < 2$); $Li_aNi_{1-b-c}Mn_bB_cO_{2-a}F_2$ (In this formula, $0.90 \leq a \leq 1$, $0 \leq b \leq 0.5$, $0 \leq c \leq 0.05$, $0 < \alpha < 2$); $Li_aNi_bE_cG_dO_2$ (In this formula, $0.90 \leq a \leq 1$, $0 \leq b \leq 0.9$, $0 \leq c \leq 0.5$, $0.001 \leq d \leq 0.1$); $Li_aNi_bCo_cMn_dG_eO_2$ (In this formula, $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (In this formula, $0.90 \leq a \leq 1$, $0.001 \leq b \leq 0.1$); $Li_aCoG_bO_2$ (In this formula, $0.90 \leq a \leq 1$, $0.001 \leq b \leq 0.1$); $Li_aMnG_bO_2$ (In this formula, $0.90 \leq a \leq 1$, $0.001 \leq b \leq 0.1$); $Li_aMn_2G_bO_4$ (In this formula, $0.90 \leq a \leq 1$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and/or $LiFePO_4$.

In the formulas representing the above-described compound, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. A compound having a coating layer added on a surface of the above-described compound may also be utilized, and a mixture of the above compound and a compound having a coating layer added thereon may also be utilized. The coating layer added on the surface of the above-described compound may include, for example, compounds of a coating element, such as oxides and hydroxides of the coating element, oxyhydroxides of the coating element, oxycarbonates of the coating element, and/or hydroxycarbonates of the coating element. Compounds forming the above coating layer may be amorphous or crystalline. The coating element included in the coating layer may be Mg, Al, Co, K, Na, Ca, Si, Ti, V, Sn, Ge, Ga, B, As, Zr, or a mixture thereof. The method by which the coating layer is formed, may be selected from among methods that do not adversely affect the physical properties of a cathode active material. Examples of the coating method may include spray coating, dip coating, and/or the like. Specific coating methods are well-understood by those of ordinary skill in the art, and as such may not be further described in more detail.

A lithium battery according to one or more embodiments employs a cathode including (e.g., containing) the above-described composite cathode active material.

By employing a cathode including (e.g., containing) the above-described composite cathode active material, the lithium battery may provide improved energy density, cycle characteristics and thermal stability.

The lithium battery may be prepared by an example method described herein, but the method is not necessarily limited thereto and can be adjusted according to required conditions.

First, a cathode may be prepared by a cathode preparation method described above.

Next, an anode may be prepared as follows. The anode may be prepared by substantially the same method as the cathode, except that, for example, an anode active material may be utilized instead of the composite cathode active material. In one or more embodiments, it is possible to utilize substantially the same conductive agent, binder, and solvent as those utilized for the cathode, in an anode active material composition.

For example, the anode active material composition may be prepared by mixing an anode active material, a conductor, a binder, and a solvent, and the anode active material composition thus prepared may be directly coated on a copper current collector, to thereby form an anode plate. In one or more embodiments, the prepared anode active material composition may be cast on a separate support, and an anode active material film exfoliated (e.g., separated and/or removed) from the support may be laminated on a copper current collector, to thereby form an anode plate.

The anode active material may be any material that is utilized as an anode active material in lithium batteries in the art. For example, the anode active material may include one or more of (e.g., one or more selected from the group consisting of) lithium metal, a metal capable of forming an alloy with lithium, a transition metal oxide, a non-transition metal oxide, and/or a carbonaceous material. Examples of the metal capable of forming an alloy with lithium may include Si, Sn, Al, Ge, Pb, Bi, Sb, a Si—Y alloy (wherein Y is an alkali metal, an alkaline earth metal, an element of Group 13, an element of Group 14, a transition metal, a rare earth metal, or a combination thereof, but not Si), a Sn—Y alloy (wherein Y is an alkali metal, an alkaline earth metal, an element of Group 13, an element of Group 14, a transition metal, a rare earth metal, or a combination thereof, but not Sn) and/or the like. For example, Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. The transition metal oxide may be, for example, a lithium titanium oxide, a vanadium oxide, a lithium vanadium oxide, and/or the like. The non-transition metal oxide may be, for example, $SnO_2$, $SiO_x$ ($0<x<2$), and/or the like. The carbonaceous material may be, for example, a crystalline carbon, an amorphous carbon, or a mixture thereof. Examples of the crystalline carbon may include graphite, including artificial graphite or natural graphite in shapeless, plate, flake, spherical or fiber form. Examples of the amorphous carbon may include soft carbon (low-temperature calcined carbon) or hard carbon, mesophase pitch carbides, calcined cokes, and/or the like.

The amounts of the anode active material, the conductor, the binder, and the solvent may be at a level commonly utilized in lithium batteries. Depending on the intended use and composition of a lithium battery, one or more of the conductor, the binder, and the solvent may not be provided.

The amount of the binder included in the anode may be, for example, about 0.1 wt % to about 10 wt %, or about 0.1 wt % to about 5 wt % with respect to the total weight of the anode active material layer. The amount of the conductor included in the anode may be, for example, about 0.1 wt % to about 10 wt %, or about 0.1 wt % to about 5 wt % with respect to the total weight of the anode active material layer. The amount of the anode active material included in the anode may be, for example, about 80 wt % to about 99 wt %, about 90 wt % to about 99 wt %, or about 95 wt % to about 99 wt % with respect to the total weight of the anode active material layer. When the anode active material is lithium metal, the anode may not include (e.g., may exclude) a binder or a conductor.

Next, a separator to be placed between the cathode and the anode may be prepared.

The separator may be any separator that is commonly utilized in lithium batteries. For the separator, for example, any separator capable of retaining a large quantity of electrolyte solution while exhibiting low resistance to ion migration in the electrolyte may be utilized. For example, the separator may be (e.g., may be selected from among) glass fiber, polyester, Teflon, polyethylene, polypropylene, polytetrafluoroethylene (PTFE), or a combination thereof. In one or more embodiments, the separator may be in the form of nonwoven fabric or woven fabric. A lithium (or lithium-ion) battery may include, for example, a rollable separator formed of polyethylene, polypropylene, and/or the like. A lithium (or lithium-ion) polymer battery may include, for example, a separator having an excellent or suitable organic liquid electrolyte immersion capability.

The separator may be prepared by an example method described herein, but the method is not necessarily limited thereto and can be adjusted according to required conditions.

First, a separator composition may be prepared by mixing a polymer resin, a filler, and a solvent. The separator composition may be directly coated and dried on an electrode to form a separator. In one or more embodiments, the separator composition may be cast and dried on a support, and a separator film exfoliated (e.g., separated and/or removed) from the support may be laminated on top of an electrode, to thereby form the separator.

A polymer utilized in the preparation of the separator is not particularly limited and may be any polymer that is utilized in a binder for an electrode plate. For example, a vinylidene fluoride/hexafluoropropylene copolymer, polyvinylidene fluoride (PVDF), polyacrylonitrile, polymethyl methacrylate, or a mixture thereof may be utilized.

Next, an electrolyte may be prepared.

The electrolyte may be, for example, an organic electrolyte solution. The organic electrolyte solution may be prepared by dissolving a lithium salt in an organic solvent.

The organic solvent may be any material that is utilized as an organic solvent in the art. Examples of the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, $\gamma$-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, and/or mixtures thereof.

The lithium salt may be any material that can be utilized as a lithium salt in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number of 1 to 20), LiCl, LiI or a mixture thereof.

In one or more embodiments, the electrolyte may be a solid electrolyte. Examples of the solid electrolyte may include a boron oxide, a lithium oxynitride, and/or the like, but are not limited thereto and may be any material that is utilized as a solid electrolyte in the art. The solid electrolyte may be formed on the anode by a method such as sputtering, for example, or a separate solid electrolyte sheet may be stacked on the anode.

The solid electrolyte may be, for example, an oxide-based solid electrolyte or a sulfide-based solid electrolyte.

The solid electrolyte may be, for example, an oxide-based solid electrolyte. The oxide-based solid electrolyte may be at least one of (e.g., one selected from among) $Li_{1+x+y}Al_xTi_{2-x}Si_yP_{3-y}O_{12}$ (0<x<2 and 0≤y<3), $BaTiO_3$, $Pb(Zr,Ti)O_3(PZT)$, $Pb_{1-x}La_xZr_{1-y}Ti_yO_3(PLZT)$ (0≤x<1 and 0≤y<1), $PB(Mg_3Nb_{2/3})O_3—PbTiO_3(PMN-PT)$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (0<x<2 and 0<y<3), $Li_xAl_yTi_z(PO_4)_3$ (0<x<2, 0<y<1, and 0<z<3), $Li_{1+x+y}(Al, Ga)_x(Ti, Ge)_{2-x}Si_yP_{3-y}O_{12}$ (0≤x≤1 and 0≤y≤1), $Li_xLa_yTiO_3$ (0<x<2 and 0<y<3), $Li_2O$, $LiOH$, $Li_2CO_3$, $LiAlO_2$, $Li_2O—Al_2O_3—SiO_2—P_2O_5—TiO_2-G_eO_2$, and/or $Li_{3+x}La_3M_2O_{12}$ (M=Te, Nb, or Zr, and x is an integer of 1 to 10). The solid electrolyte may be prepared by a sintering method, and/or the like. For example, the oxide-based solid electrolyte may be a garnet-type or kind solid electrolyte including (e.g., selected from among) $Li_7La_3Zr_2O_{12}$ (LLZO) and/or $Li_{3+x}La_3Zr_{2-a}M_aO_{12}$ (M doped LLZO, M=Ga, W, Nb, Ta, or Al, and x is an integer of 1 to 10).

The sulfide-based solid electrolyte may include, for example, lithium sulfide, silicon sulfide, phosphorus sulfide, boron sulfide, or a combination thereof. Sulfide-based solid electrolyte particles may include $Li_2S$, $P_2S_5$, $SiS_2$, $GeS_2$, $B_2S_3$, or a combination thereof. The sulfide-based solid electrolyte particles may be $Li_2S$ or $P_2S_5$. The sulfide-based solid electrolyte particles are known to have a higher lithium ion conductivity than other inorganic compounds. For example, the sulfide-based solid electrolyte may include $Li_2S$ and $P_2S_5$. When sulfide solid electrolyte materials constituting the sulfide-based solid electrolyte include $Li_2S—P_2S_5$, a mixing molar ratio of $Li_2S$ and $P_2S_5$ may be, for example, in a range of about 50:50 to about 90:10. In one or more embodiments, an inorganic solid electrolyte prepared by adding a material, such as $Li_3PO_4$, a halogen, a halogen compound, $Li_{2+2x}Zn_{1-x}GeO_4$ ("LISICON", 0≤x<1), $Li_{3+y}PO_{4-x}N_x$ ("LIPON", 0<x<4, 0<y<3), $Li_{3.25}Ge_{0.25}P_{0.75}S_4$ ("Thio-LISICON"), $Li_2O—Al_2O_3—TiO_2—P_2O_5$ ("LATP"), to an inorganic solid electrolyte, such as $Li_2S—P_2S_5$, $SiS_2$, $GeS_2$, $B_2S_3$, or a combination thereof, may be utilized as a sulfide solid electrolyte. Non-limiting examples of the sulfide solid electrolyte material may include $Li_2S—P_2S_5$; $Li_2S—P_2S_5—LiX$ (X=a halogen element); $Li_2S—P_2S_5—Li_2O$; $Li_2S—P_2S_5—Li_2O—LiI$; $Li_2S—SiS_2$; $Li_2S—SiS_2—LiI$; $Li_2S—SiS_2—LiBr$; $Li_2S—SiS_2—LiCl$; $Li_2S—SiS_2—B_2S_3—LiI$; $Li_2S—SiS_2—P_2S_5—LiI$; $Li_2S—B_2S_3$; $Li_2S—P_2S_5—Z_mS_n$ (0<m<10, 0<n<10, Z=Ge, Zn or Ga); $Li_2S—GeS_2$; $Li_2S—SiS_2—Li_3PO_4$; and $Li_2S—SiS_2-Li_pMO_q$ (0<p<10, 0<q<10, M=P, Si, Ge, B, Al, Ga or In). In this regard, the sulfide-based solid electrolyte material may be prepared by subjecting a starting material (e.g., $Li_2S$, $P_2S_5$, etc.) of the sulfide-based solid electrolyte material to a treatment such as melt quenching, mechanical milling, and/or the like. Also, a calcination process may be performed subsequent to the above treatment. The sulfide-based solid electrolyte may be amorphous or crystalline or may be in a mixed state thereof.

Figure 4:
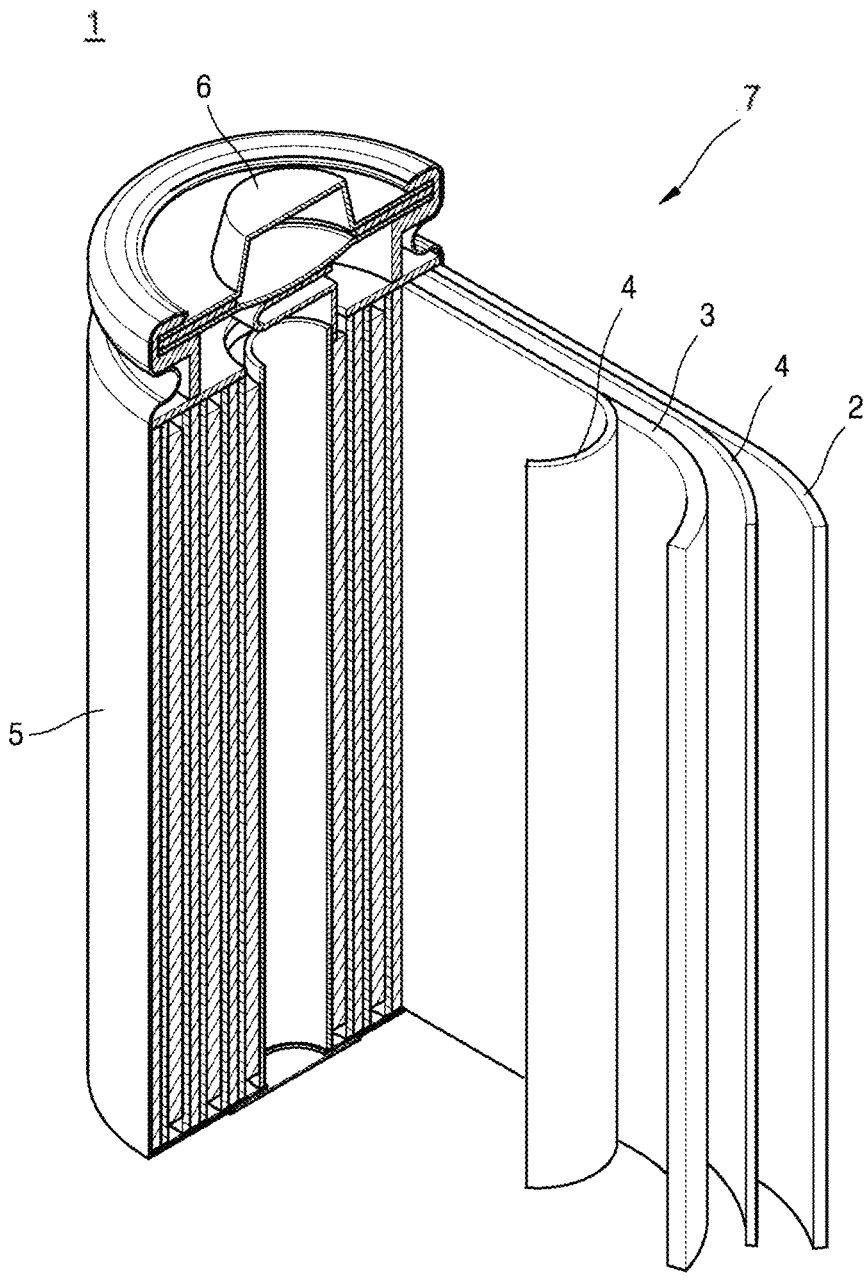
FIG. 4 is a schematic perspective diagram of a cross-section of a lithium battery according to one or more embodiments of the present disclosure.

Referring to FIG. 4, a lithium secondary battery 1 according to one or more embodiments of the present disclosure may include a cathode 3, an anode 2, and a separator 4. The cathode 3, the anode 2, and the separator 4 may be either wound or folded to form a battery structure 7. The battery structure 7 may be accommodated in a battery case 5. Subsequently, the battery case 5 may be injected with an organic electrolyte solution and sealed with a cap assembly 6, to thereby complete the lithium battery 1. The battery case 5 has a cylindrical shape, but is not necessarily limited thereto, and may have a polygonal shape, a thin-film shape, and/or the like.

Figure 5:
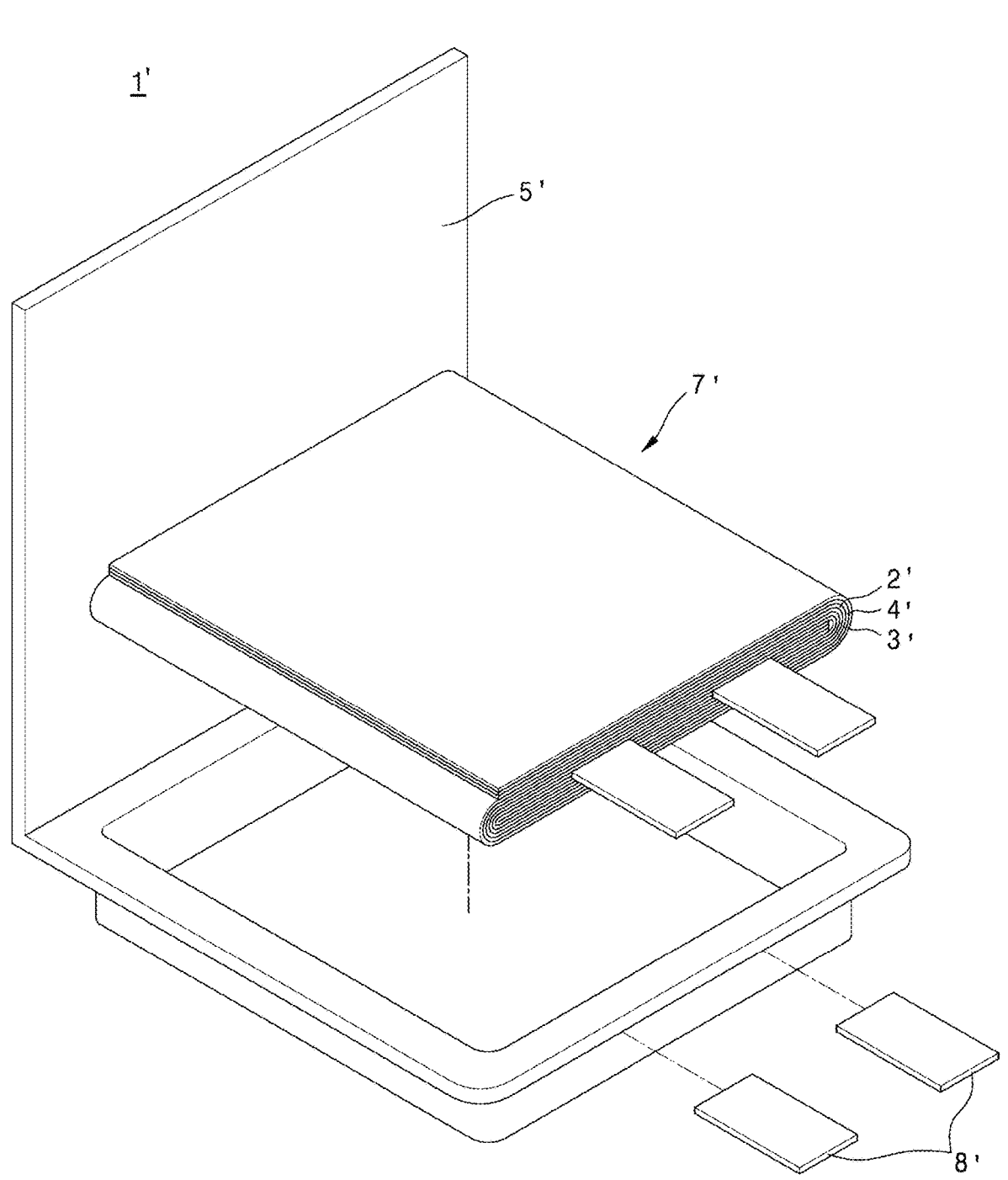
FIG. 5 is a schematic exploded perspective diagram of a lithium battery according to one or more embodiments of the present disclosure.

Referring to FIG. 5, a lithium secondary battery 1' according to one or more embodiments of the present disclosure may include a cathode 3', an anode 2', and a separator 4'. The separator 4' may be disposed between the cathode 3' and the anode 2', and the cathode 3', the anode 2', and the separator 4', may be either wound or folded to form a battery structure 7'. The battery structure 7' may be accommodated in a battery case 5'. An electrode tab 8', acting as an electrical path for guiding an electrical current formed in the battery structure 7' to the outside, may be included. The battery case 5' may be injected with an organic electrolyte solution and sealed to thereby complete the lithium battery 1'. The battery case 5' has a polygonal shape, but is not necessarily limited thereto, and may have a cylindrical shape, a thin-film shape, and/or the like.

Figure 6:
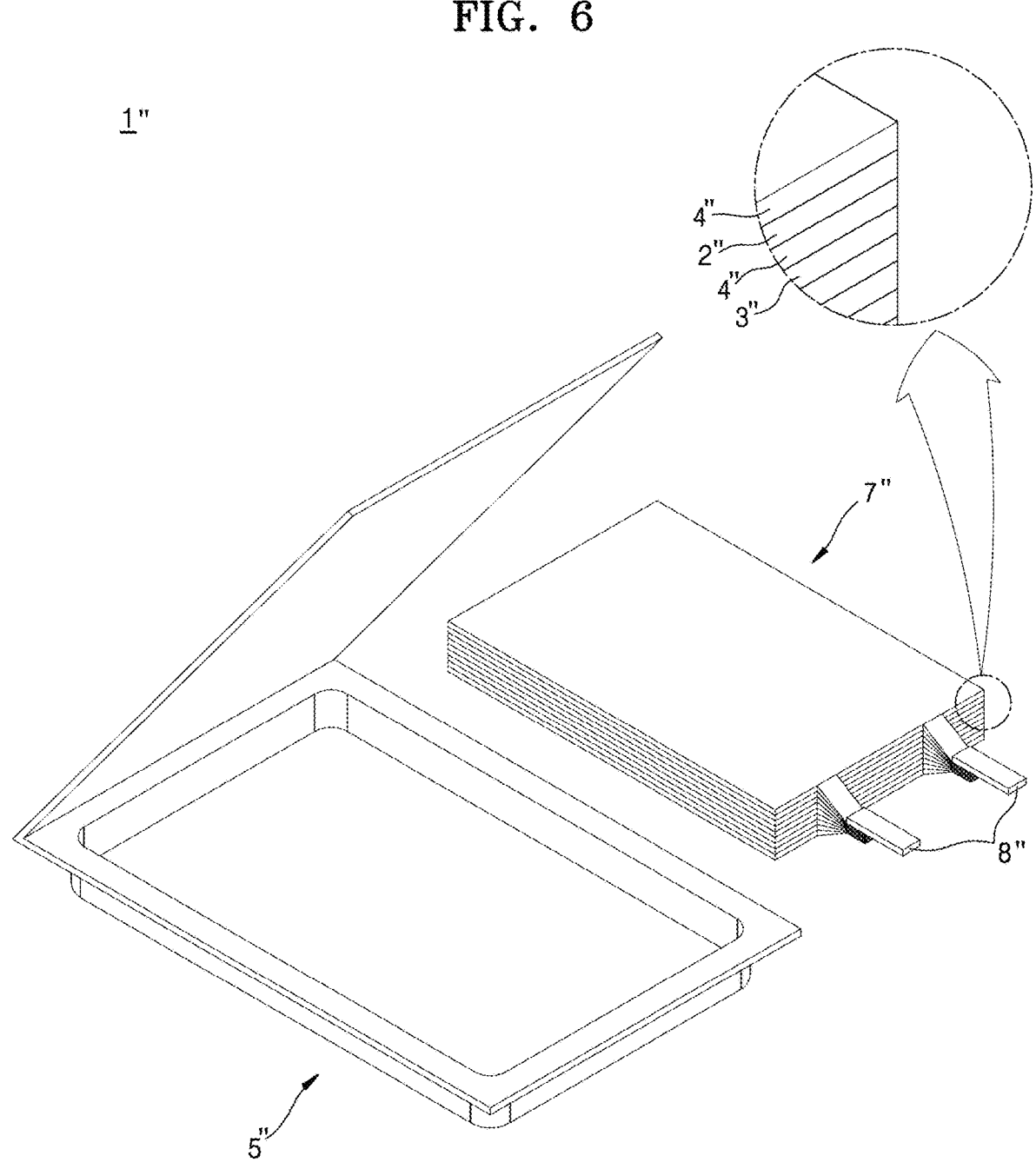
FIG. 6 is a schematic exploded perspective diagram of a lithium battery according to one or more embodiments of the present disclosure.

Referring to FIG. 6, a lithium secondary battery 1'' according to one or more embodiments of the present disclosure may include a cathode 3'', an anode 2'', and a separator 4''. The separator 4'' may be disposed between the cathode 3'' and the anode 2'' to form a battery structure. The battery structure may be stacked in a bi-cell structure and then accommodated in a battery case 5''. An electrode tab 8'', acting as an electrical path for guiding an electrical current formed in the battery structure 7'' to the outside, may be included. The battery case 5'' may be injected with an organic electrolyte solution and sealed to thereby complete the lithium battery 1''. The battery case 5'' has a polygonal shape, but is not necessarily limited thereto, and may have a cylindrical shape, a thin-film shape, and/or the like.

A pouch-type or kind lithium battery corresponds to each of the lithium batteries shown in FIGS. 4 to 6, utilizing a pouch as a battery case. The pouch-type or kind lithium battery may include one or more battery structures. A separator may be disposed between a cathode and an anode, to thereby form the battery structure. The battery structures may be stacked in a bi-cell structure, and immersed in an organic electrolyte solution, and accommodated and sealed in a pouch, to thereby form a pouch-type or kind lithium battery. For example, the above-described cathode, anode, and separator may be simply stacked and then accommodated in a pouch in the form of an electrode assembly, or may be wound or folded into an electrode assembly in the form of a jelly roll and then accommodated in a pouch. Subsequently, the pouch may be injected with an organic electrolyte solution and then sealed, to complete the lithium battery.

The lithium battery of embodiments of the present disclosure has excellent or suitable lifetime characteristics and high-rate characteristics, and therefore may be utilized in an electric vehicle (EV), an energy storage system (ESS), and/or the like. For example, the lithium battery may be utilized in a hybrid vehicle, such as a plug-in hybrid electric vehicle (PHEV) and/or the like. Also, the lithium battery may be utilized in any field that requires a large amount of energy storage. For example, the lithium battery may be utilized in an electric bicycle, a power tool, and/or the like.

Lithium batteries are stacked to form a battery module, and multiple battery modules form a battery pack. Such a battery pack may be utilized in all types (kinds) of devices in which high capacity and high output are required. For example, such a battery pack may be utilized in a laptop computer, a smartphone, an electric vehicle, and/or the like. The battery module may include, for example, a plurality of batteries and a frame holding the batteries. The battery pack may include, for example, a plurality of battery modules, and a bus bar connecting the battery modules. The battery module and/or battery pack may further include a cooling device. A plurality of battery packs may be managed by a battery management system. The battery management system may include a battery pack and a battery control device connected to the battery pack.

A method of preparing a composite cathode active material according to one or more embodiments may include: providing a first lithium transition metal oxide; providing a second lithium transition metal oxide; providing a composite; preparing at least one of a first core/shell structure and/or a second core/shell structure, the first core/shell structure being obtained by mechanically milling the first lithium transition metal oxide with the composite, and the second core/shell structure being obtained by mechanically milling the second lithium transition metal oxide with the composite; and mixing the first core/shell structure with the second lithium transition metal oxide, mixing the second core/shell structure with the first lithium transition metal oxide, or mixing the first core/shell structure with the second core/shell structure, wherein the composite may include a first metal oxide (e.g., at least one first metal oxide) represented by Formula $M_aO_b$ ($0<a\leq3$, and $0<b<4$, wherein when a is 1, 2, or 3, b is not an integer), and/or a carbonaceous material, wherein the first metal oxide may be disposed within a carbonaceous material matrix, M may be at least one metal from (e.g., one metal selected from) Groups 2 to 13, 15, and/or 16 of the Periodic Table, and the first lithium transition metal oxide and the second lithium transition metal oxide have a different particle diameter from each other, and the second lithium transition metal oxide includes a primary particle having a particle diameter of 1 μm or more.

The milling method in the mechanical milling is not particularly limited, and may be any method usable (or generally available) in the art that can contact a lithium transition metal oxide with a composite by a mechanical means (e.g., a suitable miller that causes the lithium transition metal oxide to contact the composite).

A first lithium transition metal oxide may be provided. For example, the first lithium transition metal oxide may be a compound represented by at least one of Formula 1 to 5 above.

A second lithium transition metal oxide may be provided. For example, the second lithium transition metal oxide may be a compound represented by at least one of Formula 1 to 5 above.

A composite may be provided. The providing of the composite may include, for example, providing a composite by supplying a reaction gas including (e.g., consisting of) a carbon source gas to a structure including a metal oxide, and conducting a heat-treatment. The providing a composite may include, for example, providing a composite by supplying a reaction gas including (e.g., consisting of) a carbon source gas to at least one second metal oxide represented by $M_aO_c$ ($0<a\leq3$ and $0<c\leq4$, wherein when a is 1, 2, or 3, b is an integer) and conducting a heat-treatment, wherein M may be at least one metal from (e.g., one selected from among) elements of Groups 2 to 13, Group 15, and/or Group 16 of the Periodic Table.

The carbon source gas may be a gas including (e.g., consisting of) a compound represented by Formula 6, or may be at least one mixed gas of (e.g., one selected from the group consisting of) a compound represented by Formula 6, a compound represented by Formula 7, and/or an oxygen-containing gas represented by Formula 8.

$$C_nH_{(2n+2-a)}[OH]_a \qquad \text{Formula 6}$$

In Formula 6, n is 1 to 20, and a is 0 or 1;

$$C_nH_{2n} \qquad \text{Formula 7}$$

In Formula 7, n is 2 to 6;

$$C_xH_yO_z \qquad \text{Formula 8}$$

In Formula 8, x is 0 or an integer of 1 to 20, y is 0 or an integer of 1 to 20, and z is 1 or 2.

The compound represented by Formula 7 and the compound represented by Formula 8 may be at least one of (e.g., one selected from the group consisting of) methane, ethylene, propylene, methanol, ethanol, and/or propanol. The oxygen-containing gas represented by Formula 9 may include, for example, carbon dioxide ($CO_2$), carbon monoxide (CO), water vapor ($H_2O$), or a mixture thereof.

The heat-treatment while supplying a reaction gas including (e.g., consisting of) a carbon source gas to a second metal oxide represented by $M_aO_c$ ($0<a\leq3$ and $0<c\leq4$, wherein when a is 1, 2, or 3, c is an integer) may be further followed by cooling utilizing at least one inert gas of (e.g., one inert gas selected from the group consisting of) nitrogen, helium, and/or argon. The cooling may refer to an adjustment to room temperature (20-25° C.). The carbon source gas may include at least one inert gas of (e.g., one inert gas selected from the group consisting of) nitrogen, helium, and/or argon.

In the method of preparing the composite, the process of growing a carbonaceous material, for example, graphene, may be performed under one or more suitable conditions depending on a gas-phase reaction.

According to a first condition, for example, methane may be first supplied into a reactor containing a second metal oxide represented by $M_aO_c$ ($0<a\leq3$ and $0<c\leq4$, wherein when a is 1, 2, or 3, c is an integer) and then, the temperature may be elevated to a heat-treatment temperature (T). The time taken for temperature elevation to the heat-treatment temperature (T) may be about 10 minutes to about 4 hours, and the heat-treatment temperature (T) may be in a range of about 700° C. to about 1,100° C. At the heat-treatment temperature (T), a heat-treatment may be conducted for a reaction time. The reaction time may be, for example, about 4 hours to about 8 hours. A heat-treated product may be cooled to room temperature to thereby produce a composite. The time taken for the process of cooling from the heat-treatment temperature (T) to room temperature may be, for example, about 1 hour to about 5 hours.

According to a second condition, for example, hydrogen may be first supplied into a reactor containing a second metal oxide represented by $M_aO_c$ ($0<a\leq3$ and $0<c\leq4$, wherein when a is 1, 2, or 3, c is an integer) and then, the temperature may be elevated to a heat-treatment temperature (T). The time taken for temperature elevation to the heat-treatment temperature (T) may be about 10 minutes to about 4 hours, and the heat-treatment temperature (T) may be in a range of about 700° C. to about 1,100° C. After the heat-treatment for a portion of a reaction time at the heat-treatment temperature (T), methane gas may be supplied, and then the heat-treatment may be conducted for the remainder of the reaction time. The reaction time may be, for example, about 4 hours to about 8 hours. A heat-treated product may be cooled to room temperature to thereby produce a composite. Nitrogen may be supplied during the cooling process. The time taken for the process of cooling from a heat-treatment temperature (T) to room temperature may be, for example, about 1 hour to about 5 hours.

According to a third condition, for example, hydrogen may be first supplied into a reactor containing a second metal oxide represented by $M_aO_c$ ($0<a\leq3$ and $0<c\leq4$, wherein when a is 1, 2, or 3, c is an integer) and then, the temperature may be elevated to a heat treatment temperature (T). The time taken for temperature elevation to the heat-treatment temperature (T) may be about 10 minutes to about 4 hours, and the heat-treatment temperature (T) may be in a range of about 700° C. to about 1,100° C. After the heat-treatment for a portion of a reaction time at the heat-treatment temperature (T), a mixed gas of methane and hydrogen may be supplied, and then the heat-treatment may be conducted for the remainder of the reaction time. The reaction time may be, for example, about 4 hours to about 8 hours. A heat-treated product may be cooled to room temperature to thereby produce a composite. Nitrogen may be supplied during the cooling process. The time taken for the process of cooling from a heat-treatment temperature (T) to room temperature may be, for example, about 1 hour to about 5 hours.

In the preparation process of the composite, when the carbon source gas contains water vapor, the composite obtained may have excellent or suitable conductivity. The content (e.g., amount) of water vapor in the gas mixture is not limited and may be, for example, about 0.01 vol % to about 10 vol %, relative to 100 vol % of the total volume of the carbon source gas. The carbon source gas may be, for example, methane; a mixed gas including methane and an inert gas; or a mixed gas including methane and an oxygen-containing gas.

The carbon source gas may be, for example, methane; a mixed gas of methane and carbon dioxide; or a mixed gas of methane, carbon dioxide, and water vapor. In the mixed gas of methane and carbon dioxide, the molar ratio of methane and carbon dioxide may be about 1:0.20 to about 1:0.50, about 1:0.25 to about 1:0.45, or about 1:0.30 to about 1:0.40. In the mixed gas of methane, carbon dioxide, and water vapor, the molar ratio of methane, carbon dioxide, and water vapor may be about 1:0.20 to 0.50:0.01 to 1.45, may be about 1:0.25 to 0.45:0.10 to 1.35, or may be about 1:0.30 to 0.40:0.50 to 1.0.

The carbon source gas may be, for example, carbon monoxide or carbon dioxide. The carbon source gas may be, for example, a mixed gas of methane and nitrogen. In the mixed gas of methane and nitrogen, the molar ratio of methane and nitrogen may be about 1:0.20 to 1:0.50, about 1:0.25 to 1:0.45, or about 1:0.30 to 1:0.40. In one or more embodiments, the carbon source gas may not include (e.g., may exclude) an inert gas such as nitrogen.

A heat-treatment pressure may be selected in consideration of a heat-treatment temperature, the composition of a gas mixture, a desired or suitable amount of carbon coating, and/or the like. The heat-treatment pressure may be controlled or selected by adjusting the amount of a gas mixture flowing in and the amount of a gas mixture flowing out. The heat-treatment pressure may be, for example, 0.5 atm or more, 1 atm or more, 2 atm or more, 3 atm or more, 4 atm or more, or 5 atm or more. The heat-treatment pressure may be, for example, about 0.5 atm to about 10 atm, about 1 atm to about 10 atm, about 2 atm to about 10 atm, about 3 atm to about 10 atm, about 4 atm to about 10 atm, or about 5 atm to about 10 atm.

The heat-treatment time is not particularly limited and may be appropriately adjusted depending on a heat-treatment temperature, a heat-treatment pressure, the composition of a gas mixture, a desired or suitable amount of carbon coating, and/or the like. For example, the reaction time at a heat-treatment temperature may be, for example, about 10 minutes to about 100 hours, about 30 minutes to about 90 hours, or about 50 minutes to about 40 hours. For example, as the heat-treatment time increases, the amount of deposited carbon, i.e., graphene (carbon), increases and therefore, electrical properties of the composite may be improved. However, this trend may not necessarily be directly proportional to time. For example, it may be such that after a certain amount of time, carbon deposition, for example, graphene deposition, may no longer take place, or the deposition rate may be reduced.

Through a gas-phase reaction of the carbon source gas described above, even at relatively low temperatures, a composite may be obtained by providing substantially uniform coating of a carbonaceous material, e.g., graphene coating, to one or more of (e.g., one or more selected from among) a second metal oxide represented by $M_aO_c$ ($0<a\leq3$ and $0<c\leq4$, wherein when a is 1, 2, or 3, c is an integer) and/or a reduction product thereof, and/or a first metal oxide represented by $M_aO_b$ ($0<a\leq3$ and $0<b<4$, wherein when a is 1, 2, or 3, b is not an integer).

The composite may include, for example, a matrix of a carbonaceous material, for example, a graphene matrix, which has at least one structure of (e.g., one structure selected from among) a spherical structure, a spiral structure having a plurality of spherical structures connected to one another, a cluster structure having a plurality of spherical structures clustered, and/or a sponge structure; and at least one of (e.g., one selected from among) a first metal oxide represented by $M_aO_b$ ($0<a\leq3$ and $0<b<4$, wherein a is 1, 2, or 3, and b is not an integer) and/or a second metal oxide represented by $M_aO_c$ ($0<a\leq3$ and $0<c\leq4$, wherein when a is 1, 2, or 3, c is an integer), disposed within the graphene matrix.

Next, a first core/shell structure may be prepared by mechanically milling the first lithium transition metal oxide and the composite. For the milling, a Nobilta mixer and/or the like may be utilized. For the milling, the number of rotations of the mixer may be, for example, about 1,000 rpm to about 2,500 rpm. When the milling speed is less than 1,000 rpm, the shear force applied to the first lithium transition metal oxide and the composite may be weak, such that it may render or make the formation of chemical bonds between the first lithium transition metal oxide and the composite difficult. When the milling speed is excessively high, complexation may proceed within an excessively short time, such that it may be difficult to form a substantially uniform and substantially continuous shell with the composite uniformly coated on the first lithium transition metal oxide. The milling time may be, for example, from about 5 minutes to about 100 minutes, from about 5 minutes to about 60 minutes, or from about 5 minutes to about 30 minutes. When the milling time is too short, it may be difficult to form a substantially uniform and substantially continuous shell with the composite uniformly coated on the first lithium transition metal oxide. When the milling time is too long, the production efficiency may decrease. The content (e.g., amount) of the composite may be 3 wt % or less, 2 wt % or less, or 1 wt % or less of the total weight of the first lithium transition metal oxide and the composite. The content (e.g., amount) of the composite may be, for example, about 0.01 wt % to about 3 wt %, about 0.1 wt % to about 2 wt %, or about 0.1 wt % to about 1 wt % relative to the total weight of the first lithium transition metal oxide and the composite. For example, the content (e.g., amount) of the composite may be about 0.01 parts by weight to about 3 parts by weight, about 0.1 parts by weight to about 3 parts by weight, about 0.1 parts by weight to about 2 parts by weight, or about 0.1 parts by weight to about 1 part by weight, relative to 100 parts by weight of the mixture of the first lithium transition metal oxide and the composite. The average particle diameter (D50) of the composite utilized for mechanical milling of the first lithium transition metal oxide and the composite may be, for example, about 1 μm to about 20 μm, about 3 μm to about 15 μm, or about 5 μm to about 10 μm.

In one or more embodiments, the second core/shell structure may be prepared by mechanically milling a second lithium transition metal oxide with a composite. The second core/shell structure may be prepared following the same process as the first core/shell structure, except that the second lithium transition metal oxide is utilized instead of the first lithium transition metal oxide.

In one or more embodiments, according to the above-described method, the first core/shell structure and the second core/shell structure may be prepared, respectively.

Next, a composite cathode active material is prepared by mixing the first core/shell structure with the second lithium transition metal oxide. The mixing of the first core/shell structure and the second lithium transition metal oxide may be, in a weight ratio, for example, of about 90:10 to about 60:40, about 85:15 to about 65:35, or about 80:20 to about 70:30. When the first core/shell structure and the second lithium transition metal oxide have a weight ratio in such ranges, the energy density and/or cycle characteristics of a lithium battery including the composite cathode active material may be further improved.

In one or more embodiments, the composite cathode active material may be prepared by mixing the first lithium transition metal oxide with the second core/shell structure. The mixing of the first lithium transition metal oxide and the second core/shell structure may be in a weight ratio, for example, of about 90:10 to about 60:40, about 85:15 to about 65:35, or about 80:20 to about 70:30. When the first lithium transition metal oxide and the second core/shell structure have a weight ratio in such ranges, the energy density and/or cycle characteristics of a lithium battery including the composite cathode active material may be further improved.

In one or more embodiments, the composite cathode active material may be prepared by mixing the first core/shell structure with the second core/shell structure. The mixing of the first core/shell structure and the second core/shell structure may be, in a weight ratio, for example, of about 90:10 to about 60:40, about 85:15 to about 65:35, or about 80:20 to about 70:30. When the first core/shell structure and the second core/shell structure have a weight ratio in such ranges, the energy density and/or cycle characteristics of a lithium battery including the composite cathode active material may be further improved.

The following Examples and Comparative Examples are provided to describe the embodiments in greater detail. However, it will be understood that the Examples are provided only to illustrate the embodiments and not to be construed as limiting the scope of the embodiments.

Preparation of Composite

Preparation Example 1: $Al_2O_3$@Gr Composite

Once $Al_2O_3$ particles (average particle diameter: about 20 nm) were placed inside a reactor, the temperature inside the reactor was elevated to 1,000° C., while supplying $CH_4$ into the reactor at about 300 sccm, at 1 atm for about 30 minutes.

Subsequently, while maintaining at the above temperature for 7 hours, a heat-treatment was conducted. Subsequently, by adjusting the temperature inside the reactor to room temperature (20-25° C.), a composite having $Al_2O_3$ particles and a reduction product thereof, $Al_2O_z$ (0<z<3) particles, embedded in graphene, was obtained.

The content (e.g., amount) of alumina included in the composite was 60 wt %.

Comparative Preparation Example 1: $SiO_2$@Gr Composite

Once $SiO_2$ particles (average particle diameter: about 15 nm) were placed inside a reactor, the temperature inside the reactor was elevated to 1,000° C., while supplying $CH_4$ into the reactor at about 300 sccm, at 1 atm for about 30 minutes.

Subsequently, while maintaining at the above temperature for 7 hours, a heat-treatment was conducted. Subsequently, by adjusting the temperature inside the reactor to room temperature (20-25° C.), a composite having $SiO_2$ particles and a reduction product thereof, $SiO_y$ (0<y<2) particles, embedded in graphene, was obtained.

Preparation of Composite Cathode Active Material

Example 1: $Al_2O_3$@Gr Composite 0.4 wt %
(Alumina 0.24 wt %) Coated Large-Diameter
NCA91 and $Al_2O_3$@Gr Composite 0.4 wt %
(Alumina 0.24 wt %) Coated Small-Diameter
NCA91

Large-diameter $LiNi_{0.91}Co_{0.05}Al_{0.04}O_2$, having an average particle diameter of 10 μm (hereinafter, referred to as large-diameter NCA91) and the composite prepared in Preparation Example 1 were milled together, utilizing a Nobilta mixer (Hosokawa, Japan), for about 5-30 minutes at a rotation rate of about 1,000 to 2,000 rpm, to produce a first core/shell structure. The mixing weight ratio of the large-diameter NCA91 and the composite obtained according to Preparation Example 1 was 99.6: 0.4. The large-diameter NCA91 is a secondary particle having a structure in which plate primary particles are radially arranged. The large-diameter NCA91 has a structure in which a major axis of the plate primary particle included in the large-diameter NCA91 is radially arranged. The large-diameter NCA91 may have, for example, the structure shown in FIG. 3.

Small-diameter $LiNi_{0.91}Co_{0.05}Al_{0.04}O_2$, having an average particle diameter of 3 μm (hereinafter, referred to as small-diameter NCA91) and the composite prepared in Preparation Example 1 were milled together, utilizing a Nobilta mixer (Hosokawa, Japan), for about 5-30 minutes at a rotation rate of about 1,000 to 2,000 rpm, to produce a second core/shell structure. The mixing weight ratio of the small-diameter NCA91 and the composite obtained according to Preparation Example 1 was 99.6:0.4. The small-diameter NCA91 has a one-body particle shape (e.g., includes separate, individual particles) and is a particle having a single-crystal structure.

A composite cathode active material was prepared by mixing the first core/shell structure and the second core/shell structure in a weight ratio of 7:3.

By measuring the particle size distribution with a particle size analyzer (PSA), it was confirmed that the composite cathode active material had a bimodal particle size distribution.

Example 2: Al₂O₃@Gr Composite 0.4 wt % (Alumina 0.24 wt %) Coated Large-Diameter NCA91 and Bare Small-Diameter NCA91

A composite cathode active material was prepared following the same process as Example 1, except that small-diameter NCA91 was utilized as is instead of the second core/shell structure.

A composite cathode active material was prepared by mixing the first core/shell structure and small-diameter NCA91 in a weight ratio of 7:3.

By measuring the particle size distribution with a particle size analyzer (PSA), it was confirmed that the composite cathode active material had a bimodal particle size distribution.

Example 3: Bare Large-Diameter NCA91 and Al₂O₃@Gr Composite 0.4 wt % (Alumina 0.24 wt %) Coated Small-Diameter NCA91

A composite cathode active material was prepared following the same process as Example 1, except that the large-diameter NCA91 was utilized as is, instead of the first core/shell structure.

A composite cathode active material was prepared by mixing large-diameter NCA91 and the second core/shell structure in a weight ratio of 7:3.

By measuring the particle size distribution with a particle size analyzer (PSA), it was confirmed that the composite cathode active material had a bimodal particle size distribution.

Comparative Example 1: Bare Large-Diameter NCA91 and Bare Small-Diameter NCA91

A composite cathode active material was prepared following the same process as Example 1, except that the large-diameter NCA91 was utilized as is instead of the first core/shell structure, and the small-diameter NCA91 was utilized as is instead of the second core/shell structure.

A composite cathode active material was prepared by mixing the large-diameter NCA91 and the small-diameter NCA91 in a weight ratio of 7:3.

By measuring the particle size distribution with a particle size analyzer (PSA), it was confirmed that the composite cathode active material had a bimodal particle size distribution.

Comparative Example 2: SiO₂@Gr Composite 0.4 wt % (Silica 0.24 wt %) Coated Large-Diameter NCA91 and: SiO₂@Gr Composite 0.4 wt % (Silica 0.24 wt %) Coated Small-Diameter NCA91

A composite cathode active material was prepared following the same process as Example 1, except that the $SiO_2$@Gr composite prepared in Comparative Example 1 was utilized instead of the $Al_2O_3$@Gr composite prepared in Preparation Example 1.

Comparative Example 3: Al₂O₃ 0.4 wt % Coated Large-Diameter NCA91 and Al₂O₃ 0.4 wt % Coated Small-Diameter NCA91

A composite cathode active material was prepared following the same process as Example 1, except that the shell was formed utilizing $Al_2O_3$ particles (average particle diameter: about 20 nm) instead of the composite prepared in Preparation Example 1.

A composite cathode active material was prepared by mixing alumina-coated large-diameter NCA91 and alumina-coated small-diameter NCA91 in a weight ratio of 7:3.

By measuring the particle size distribution with a particle size analyzer (PSA), it was confirmed that the composite cathode active material had a bimodal particle size distribution.

Comparative Example 4: Bare Large-Diameter NCA91 Alone

A composite cathode active material was prepared following the same process as Example 1, except that large-diameter NCA91 was utilized as the composite cathode active material as is, and the small-diameter NCA91 was excluded.

By measuring the particle size distribution with a particle size analyzer (PSA), it was confirmed that the composite cathode active material had a monomodal particle size distribution.

Manufacture of Lithium Battery (Half Cell)

Example 4

Preparation of Cathode

A mixture containing the composite cathode active material prepared in Example 1, a carbon conducting agent (Denka Black), and polyvinylidene fluoride (PVdF) in a weight ratio of 96:2:2 was mixed with N-methylpyrrolidone (NMP) utilizing agate mortar and pestle, to produce a slurry.

The slurry was bar-coated on an aluminum current collector having a thickness of 15 μm, dried at room temperature, dried again under vacuum and at 120° C., and rolled and punched to produce a cathode having a thickness of 60 μm.

Preparation of Coin Cell

Using the cathode prepared above, and utilizing lithium metal as a counter electrode, a PTFE separator, and a solution containing 1.5 M $LiPF_6$ dissolved in EC (ethylene carbonate)+EMC (ethylmethyl carbonate)+DMC (dimethyl carbonate) (2:1:7 volume ratio) as an electrolyte, a coin cell was prepared.

Examples 5 and 6

A coin cell was prepared following the same process as Example 4, except that the composite cathode active materials prepared in Examples 2 and 3 were utilized, respectively, instead of the composite cathode active material prepared in Example 1.

Comparative Examples 5 to 8

A coin cell was prepared following the same process as Example 4, except that the composite cathode active materials prepared in Comparative Examples 1 to 4 were utilized, respectively, instead of the composite cathode active material prepared in Example 1.

Evaluation Example 1: Evaluation of XPS Spectrums

In the preparation process of the composite prepared in Preparation Example 1, XPS spectrums over time were obtained utilizing a Quantum 2000 (Physical Electronics). XPS spectrums of C 1s orbitals and Al 2p orbitals of the sample were obtained before temperature elevation, after 1 minute, 5 minutes, 30 minutes, 1 hour, and 4 hours. At the beginning of temperature elevation, the XPS spectrum only showed Al 2p peaks but did not show C 1s peaks. After 30 minutes, C 1s peaks have become apparent and sizes of Al 2p peaks were significantly reduced.

After 30 minutes, around 284.5 eV, C 1s peaks attributed to C—C bonding and C=C bonding due to graphene growth have become apparent.

Because the oxidation number of aluminum decreases as the reaction time elapses, the position of Al 2p peak shifted toward a lower binding energy (eV).

Accordingly, it was confirmed that as the reaction progressed, graphene grew on $Al_2O_3$ particles, and $Al_2O_x$ (0<x<3), which is a reduction product of $Al_2O_3$, was produced.

Through XPS analysis results, average carbon and aluminum contents were measured from 10 regions of a composite sample prepared in Preparation Example 1. For the result of measurement, a deviation in aluminum content (e.g., amount) for each section was calculated. Deviations in aluminum content (e.g., amount) were expressed as percentage relative to an average value, and then referred to as uniformity. A percentage relative to an average value of deviations in aluminum content (e.g., amount), that is, uniformity of aluminum content (e.g., amount), was 1%. Accordingly, substantially uniform distribution of alumina within the composite prepared in Preparation Example 1 was confirmed.

Evaluation Example 2: SEM, HR-TEM and SEM-EDAX Analyses

Scanning electron microscopy, high-resolution transmission electron microscopy and EDAX analysis were performed on the composite prepared in Preparation Example 1, the composite cathode active material prepared in Example 1, and the composite cathode active material prepared in Comparative Example 1.

For SEM-EDAX analysis, an FEI Titan 80-300 by PHILIPS was utilized.

The composite prepared in Preparation Example 1 was shown to have a structure in which $Al_2O_3$ particles and a reduction product thereof, $Al_2O_z$ (0<z<3) particles, are embedded in graphene. It was confirmed that a graphene layer was disposed on the outside of one or more particles of (e.g., selected from among) $Al_2O_3$ particles and/or $Al_2O_z$ (0<z<3). One or more particles of (e.g., selected from among) $Al_2O_3$ particles and/or $Al_2O_z$ (0<z<3) may be evenly distributed within a graphene matrix. One or more particles of (e.g., selected from among) $Al_2O_3$ particles and/or $Al_2O_z$ (0<z<3) may have a particle diameter of about 20 nm. The particle diameter of the composite prepared in Preparation Example 1 was about 100 nm to 200 nm. In the composite cathode active material prepared in Example 1, it was confirmed that a shell formed by the composite including graphene was disposed on the NCA core.

In the SEM-EDAX analysis of the composite positive active materials prepared in Comparative Example 1 and Example 1, it was confirmed that the concentration of aluminum (Al) distributed on the surface of the composite positive active material of Example 1 was increased compared to the surface of the composite cathode active material of Comparative Example 1.

Accordingly, it was confirmed that in the composite cathode active material of Example 1, the composite prepared in Preparation Example 1 was uniformly coated on the NCA core to form a shell.

Evaluation Example 3: Measurement of Pellet Density

Pellet density was measured for the composite cathode active materials prepared in Examples 1 to 3 and Comparative Example 4, and the results thereof are shown in Table 1.

A cathode active material having a pellet form, obtained by placing 1 g of each of the cathode active materials prepared in Examples 1 to 3 and Comparative Example 4 into a circular mold having a diameter of 1 cm, and then applying a pressure of 1000 $kgf/cm^2$, was measured for density as mass per volume.

TABLE 1

|  | Pellet density [g/cc] |
| --- | --- |
| Example 1: Large-particle small-particle coating | 3.7 |
| Example 2: Large-particle coating | 3.7 |
| Example 3: Small-particle coating | 3.8 |
| Comparative Example 4: Large-particle non-coating | 3.3 |

As shown in Table 1, the composite cathode active materials of Examples 1 to 3 having a bimodal particle size distribution had an increased pellet density compared to the composite cathode active material of Comparative Example 4 having a monomodal particle size distribution.

It was confirmed that a lithium battery including the composite cathode active material of Examples 1 to 3 is capable of providing an improved energy density compared to a lithium battery including the composite cathode active material of Comparative Example 4.

Evaluation Example 4: Evaluation of High-Temperature (45° C.) Charge/Discharge Characteristics The lithium batteries prepared in Examples 4 to 6 and Comparative Examples 5 to 8 were charged at a constant current rate of 0.1 C at 25° C. until the battery voltage reached 4.3 V (vs. Li) and then in a constant voltage mode, were cut off at 4.3 V with 0.05 C rate. Subsequently, the battery was discharged at a constant current rate of 0.1 C until the battery voltage reached 2.8 V (vs. Li) during discharge (formation cycle).

The lithium batteries after the formation cycle were charged at a constant current rate of 0.2 C at 45° C. until the battery voltage reached 4.3 V (vs. Li), and then in a constant voltage mode, were cut off at 4.3 V with 0.05 C rate. Subsequently, the battery was discharged at a constant current of 0.2 C rate until the battery voltage reached 2.8 V during discharge (1st cycle). The above cycle was repeated under the same conditions up to the 100th cycle.

In all charge/discharge cycles, after each charge/discharge cycle, a rest period of 10 minutes was provided. A part of room-temperature charge/discharge test results is shown in Table 2. Initial efficiency is defined by Equation 1, and capacity retention rate is defined by Equation 2.

$$\text{Initial efficiency[\%]=[Discharge capacity at 1st cycle/Charging capacity at 1st cycle]}\times100 \qquad \text{Equation 1}$$

$$\text{Capacity retention rate [\%]=[Discharge capacity at 100th cycle/Discharge capacity at 1st cycle]}\times 100 \qquad \text{Equation 2}$$

Evaluation Example 5: Evaluation of Direct Current Internal Resistance (DC-IR) Before and After High-Temperature Charging/Discharging Direct current internal resistance (DC-IR) of the lithium batteries prepared in Examples 4 to 6 and Comparative Examples 5 to 8 were measured before, and after, the high-temperature charging/discharging evaluation respectively, by the following method.

In the 1st cycle, the lithium batteries were charged up to a voltage of 50% SOC (state of charge) at 0.5 C and were cut off at 0.02 C, and then rested for 10 minutes.

Then, the batteries were discharged at a constant current rate of 0.5 C for 30 seconds and rested for 30 seconds, and then were charged at a constant current rate of 0.5 C for 30 seconds, and rested for 10 minutes.

Then, the batteries were discharged at a constant current rate of 1.0 C for 30 seconds, followed by resting for 30 seconds, and then were charged at a constant current rate of 0.5 C for 1 minute, and rested for 10 minutes.

Then, the batteries were discharged at a constant current rate of 2.0 C for 30 seconds and rested for 30 seconds, and then were charged at a constant current rate of 0.5 C for 2 minutes and rested for 10 minutes.

Then, the batteries were discharged at a constant current rate of 3.0 C for 30 seconds and rested for 30 seconds, and then were charged at a constant current rate of 0.5 C for 3 minutes and rested for 10 minutes.

Direct current internal resistance (DC-IR, R=ΔV/ΔI) was calculated from the ratio of an average voltage change (ΔV)

and an average current change (ΔI) during constant current discharging at each C-rate, and an average value thereof was used as a measured value.

A part of direct current internal resistance measured before the high-temperature charge/discharge evaluation, and direct current internal resistance measured after the room-temperature charge/discharge evaluation is shown in Table 2.

TABLE 2

| | Initial efficiency [%] | Capacity retention rate [%] | Initial DC-IR [ohm] | DC-IR after 100th cycle [ohm] |
|---|---|---|---|---|
| Example 4: Large-particle small-particle coating | 89.3 | 88.7 | 3.9 | 13.9 |
| Example 5: Large-particle coating | 89.4 | 92.4 | 4.9 | 9.4 |
| Example 6: Small-particle coating | 89.9 | 78.6 | 3.8 | 14.2 |
| Comparative Example 5: Large-particle small-particle non-coating | 90.6 | 66.6 | 3.8 | 42.0 |

As shown in Table 2, the lithium batteries of Examples 4 to 6 have improved high-temperature lifetime characteristics and suppressed or reduced increase of DC internal resistance, compared to that of the lithium battery of Comparative Example 5.

Although not shown in Table 2, the lithium batteries of Examples 4 to 6 have improved high-temperature lifetime characteristics compared to the lithium batteries of Comparative Examples 6 and 7.

In the lithium batteries of Examples 4 to 6, the increase in DC internal resistance after high-temperature charging/discharging was significantly suppressed or reduced as compared to the lithium battery of Comparative Example 5.

Evaluation Example 6: Evaluation of Room-Temperature High-Rate Characteristics The lithium batteries prepared in Examples 4 to 6 and Comparative Examples 5 to 8 were charged at a constant current rate of 0.1 C at 25° C. until the battery voltage reached 4.3 V (vs. Li) and then in a constant voltage mode, were cut off at 4.3 V with 0.05 C rate. Subsequently, the battery was discharged at a constant current rate of 0.1 C until the battery voltage reached 2.8 V (vs. Li) during discharge (formation cycle).

The lithium batteries after the formation cycle were charged at a constant current rate of 0.2 C at 25° C. until the battery voltage reached 4.3 V (vs. Li), and then in a constant voltage mode, were cut off at 4.3 V with 0.05 C rate. Subsequently, the battery was discharged at a constant current rate of 0.2 C until the battery voltage reached 2.8 V during discharge (1st cycle).

The lithium batteries after the 1st cycle were charged at a constant current rate of 0.2 C at 25° C. until the battery voltage reached 4.3 V (vs. Li), and then in a constant voltage mode, were cut off at 4.3 V with 0.05 C rate. Subsequently, the battery was discharged at a constant current rate of 0.5 C until the battery voltage reached 2.8 V during discharge (2nd cycle).

The lithium batteries after the 2nd cycle were charged at a constant current rate of 0.2 C at 25° C. until the battery voltage reached 4.3 V (vs. Li), and then in a constant voltage mode, were cut off at 4.3 V with 0.05 C rate. Subsequently, the lithium batteries were discharged at a constant current rate of 4.0 C until the battery voltage reached 2.8 V (vs. Li) during discharge (3rd cycle).

The lithium batteries after the 3rd cycle were charged at a constant current rate of 0.2 C at 25° C. until the battery voltage reached 4.3 V (vs. Li), and then in a constant voltage mode, were cut off at 4.3 V with 0.05 C rate. Subsequently, the battery was discharged at a constant current rate of 2.0 C until the battery voltage reached 2.8 V (vs. Li) during discharge (4th cycle).

The lithium batteries after the 4th cycle were charged at a constant current rate of 0.2 C at 25° C. until the battery voltage reached 4.3 V (vs. Li), and then in a constant voltage mode, were cut off at 4.3 V with 0.05 C rate. Subsequently, the battery was discharged at a constant current rate of 4.0 C until the battery voltage reached 2.8 V during discharge (5th cycle).

In all charge/discharge cycles, after each charge/discharge cycle, a rest period of 10 minutes was provided. A part of room-temperature charge/discharge test results is shown in Table 2. High-rate characteristics are defined by Equation 3.

High-rate characteristics [%]=[4.0 C rate discharge capacity ($5^{th}$ cycle discharge capacity)/0.2C rate discharge capacity ($1^{st}$ cycle discharge capacity)]×100　　　Equation 3

TABLE 3

| | High-rate characteristics [%] |
| --- | --- |
| Example 4: Large-particle small-particle coating | 93.1 |
| Example 5: Large-particle coating | 93.0 |
| Example 6: Small-particle coating | 91.7 |
| Comparative Example 5: Large-particle small-particle non-coating | 89.5 |

As shown in Table 3, the lithium batteries of Examples 4 to 6 have improved high-rate characteristics compared to that of the lithium battery of Comparative Example 5.

Although not shown in Table 3, the lithium batteries of Examples 4 to 6 have improved high-rate characteristics compared to that of the lithium batteries of Comparative Examples 6 and 7.

According to aspects of embodiments of the present disclosure, the lithium battery including the composite cathode active material including a shell including a first metal oxide and a carbonaceous material and disposed on the core of at least one of the large-diameter lithium transition metal oxide and/or the small-diameter lithium transition metal oxide, with the small-diameter lithium transition metal oxide having a one body particle shape, may have improved high-temperature cycle characteristics, and may suppress or reduce an increase of internal resistance, and may have improved high-rate characteristics.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As used herein, the term "substantially," "about," and similar terms are used as terms of approximation and not as terms of degree, and are intended to account for the inherent deviations in measured or calculated values that would be recognized by those of ordinary skill in the art. "Substantially" as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The portable device, vehicle, and/or the battery, e.g., a battery controller (e.g., a battery management system), and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that one or more suitable changes in form and details may be made therein without departing from the spirit and scope of the disclosure as defined by the following claims and equivalents thereof.

What is claimed is:

1. A composite cathode active material comprising:
a first core comprising a first lithium transition metal oxide;
a second core comprising a second lithium transition metal oxide; and
a shell along a surface of at least one of the first core or the second core,
wherein the shell comprises:
a first metal oxide represented by Formula $M_aO_b$ ($0<a\leq3$, and $0<b<4$, wherein when a is 1, 2, or 3, b is not an integer); and
a carbonaceous material, and
wherein the first metal oxide is within a carbonaceous material matrix, and M is at least one metal selected from Groups 2 to 13, 15, and 16 of the Periodic Table,
wherein the first lithium transition metal oxide and the second lithium transition metal oxide are different in particle diameter from each other, and
wherein the second lithium transition metal oxide comprises a primary particle having a particle diameter of 1 μm or more.

2. The composite cathode active material of claim 1, wherein the first lithium transition metal oxide comprises a secondary particle comprising a plurality of primary particles, and
the secondary particle comprises a structure in which the plurality of primary particles of the structure of the secondary particle are arranged in a radial shape.

3. The composite cathode active material of claim 2, wherein the plurality of primary particles of the structure of the secondary particle are plate particles and major axes of the plate particles are radially arranged.

4. The composite cathode active material of claim 1, wherein the first lithium transition metal oxide is larger in lithium transition metal oxide particle diameter than that of the second lithium transition metal oxide.

5. The composite cathode active material of claim 1, wherein the first lithium transition metal oxide and the second lithium transition metal oxide have a bimodal particle size distribution in a particle size distribution diagram, and
a particle diameter ratio of the first lithium transition metal oxide and the second lithium transition metal oxide is about 3:1 to about 40:1.

6. The composite cathode active material of claim 1, wherein the first lithium transition metal oxide has a particle size of more than about 8 μm to about 30 μm, and the second lithium transition metal oxide has a particle size of about 1 μm to less than 8 μm.

7. The composite cathode active material of claim 1, wherein a weight ratio of the first lithium transition metal oxide and the second lithium transition metal oxide is about 90:10 to about 60:40.

8. The composite cathode active material of claim 1, wherein the shell is only on the first core or the shell is only on the second core.

9. The composite cathode active material of claim 1, wherein
the first metal oxide is at least one of $Al_2O_z$ ($0<z<3$), $NbO_x$ ($0<x<2.5$), $MgO_x$ ($0<x<1$), $Sc_2O_z$ ($0<z<3$), $TiO_y$ ($0<y<2$), $ZrO_y$ ($0<y<2$), $V_2O_z$ ($0<Z<3$), $WO_y$ ($0<y<2$), $MnO_y$ ($0<y<2$), $Fe_2O_z$ ($0<Z<3$), $Co_3O_w$ ($0<w<4$), $PdO_x$ ($0<x<1$), $CuO_x$ ($0<x<1$), $AgO_x$ ($0<x<1$), $ZnO_x$ ($0<x<1$), $Sb_2O_z$ ($0<z<3$), or $SeO_y$ ($0<y<2$).

10. The composite cathode active material of claim 1, wherein the shell further comprises a second metal oxide represented by Formula $M_aO_c$ ($0<a\leq3$, and $0<c\leq4$, wherein when a is 1, 2, or 3, c is an integer),
the second metal oxide comprises a same metal as the first metal oxide, and
a ratio of a and c in the second metal oxide, c/a, has a greater value than a ratio of a and b in the first metal oxide, b/a.

11. The composite cathode active material of claim 10, wherein the second metal oxide comprises $Al_2O_3$, $NbO$, $NbO_2$, $Nb_2O_5$, $MgO$, $Sc_2O_3$, $TiO_2$, $ZrO_2$, $V_2O_3$, $WO_2$, $MnO_2$, $Fe_2O_3$, $Co_3O_4$, $PdO$, $CuO$, $AgO$, $ZnO$, $Sb_2O_3$, or $SeO_2$, and
the first metal oxide is a reduction product of the second metal oxide.

12. The composite cathode active material of claim 1, wherein the shell has a thickness of about 1 nm to about 5 μm.

13. The composite cathode active material of claim 1, wherein the shell comprises at least one of a composite comprising the first metal oxide and the carbonaceous material, or a milling product of the composite, and
a content of the at least one of the composite or the milling product of the composite is 3 wt % or less relative to a total weight of the composite cathode active material.

14. The composite cathode active material of claim 13, wherein the composite further comprises a second metal oxide having a different composition than the first metal oxide,
at least one of the first metal oxide or the second metal oxide has a particle size of about 1 nm to about 1 μm, and
the at least one of the first metal oxide or the second metal oxide has a uniformity deviation of 3% or less.

15. The composite cathode active material of claim 13, wherein the carbonaceous material has a branched structure, the first metal oxide is distributed within the branched structure, and the branched structure comprises a plurality of carbonaceous material particles in contact with one another.

16. The composite cathode active material of claim 1, wherein the first lithium transition metal oxide and the second lithium transition metal oxide are each independently represented by at least one of Formulas 1 to 5:

$$Li_aNi_xCo_yM_zO_{2-b}A_b \qquad \text{Formula 1}$$

wherein, in Formula 1, $1.0\leq a\leq1.2$, $0\leq b\leq0.2$, $0.8\leq x<1$, $0<y\leq0.3$, and $0<z\leq0.3$, wherein $x+y+z=1$, M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof, and A is F, S, Cl, Br, or a combination thereof, $$LiNi_xCo_yMn_zO_2 \qquad \text{Formula 2}$$

$$LiNi_xCo_yAl_zO_2 \qquad \text{Formula 3}$$

wherein, in Formula 2 and 3, $0.8\leq x\leq0.95$, $0<y\leq0.2$, and $0<z\leq0.2$, wherein $x+y+z=1$, $$LiNi_xCo_yMn_zAl_wO_2 \qquad \text{Formula 4}$$

wherein, in Formula 4, 0.8≤x≤0.95, 0<y≤0.2, 0<z≤0.2, and 0<w≤0.2, wherein x+y+z+w=1, $$Li_aCo_xM_yO_{2-b}A_b$$ Formula 5 wherein, in Formula 5, 1.0≤a≤1.2, 0≤b≤0.2, 0.9≤x≤1, and 0≤y ≤0.1, wherein x+y=1, M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof, and A is F, S, Cl, Br, or a combination thereof.

17. The composite cathode active material of claim 1, wherein the shell is on both the first core and the second core.

18. The composite cathode active material of claim 1, wherein the first metal oxide comprises at least one metal of Al, Nb, Mg, Sc, Ti, Zr, V, W, Mn, Fe, Co, Pd, Cu, Ag, Zn, Sb, or Se.

19. A cathode comprising the composite cathode active material of claim 1.

20. A lithium battery comprising the cathode of claim 19, an anode, and an electrolyte between the cathode and the anode.

21. A method of preparing a composite cathode active material, the method comprising:

supplying a first lithium transition metal oxide;

supplying a second lithium transition metal oxide;

supplying a composite;

preparing at least one of a first core/shell structure or a second core/shell structure, the first core/shell structure being obtained by mechanically milling the first lithium transition metal oxide with the composite, and the second core/shell structure being obtained by mechanically milling the second lithium transition metal oxide with the composite; and mixing the first core/shell structure with the second lithium transition metal oxide, mixing the second core/shell structure with the first lithium transition metal oxide, or mixing the first core/shell structure with the second core/shell structure, wherein the composite comprises: a first metal oxide represented by Formula $M_aO_b$ (0<a≤3, and 0<b<4, wherein when a is 1, 2, or 3, b is not an integer); and a carbonaceous material, and wherein the first metal oxide is within a carbonaceous material matrix, and M is at least one metal from Groups 2 to 13, 15, or 16 of the Periodic Table, wherein the first lithium transition metal oxide and the second lithium transition metal oxide have a different particle diameter from each other, and wherein the second lithium transition metal oxide comprises a primary particle having a particle size of 1 μm or more.

22. The method of claim 21, wherein the supplying the composite comprises applying a reaction gas comprising a carbon source gas to at least one second metal oxide represented by $M_aO_c$ (0<a≤3 and 0<c≤4, wherein when a is 1, 2, or 3, c is an integer), and performing a heat treatment, wherein M is at least one metal selected from Groups 2 to 13, Group 15, and Group 16 of the Periodic Table.

\* \* \* \* \*